(12) United States Patent
Krarti

(10) Patent No.: US 12,738,882 B2
(45) **Date of Patent: *Sep. 15, 2026**

(54) SYSTEMS AND METHODS FOR CONSERVING THERMAL AND ELECTRICAL ENERGY USAGE IN BUILDINGS AND HOUSES

(71) Applicant: The Regents of the University of Colorado, Denver, CO (US)

(72) Inventor: Moncef Krarti, Longmont, CO (US)

(73) Assignee: The Regents of the University of Colorado, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/497,414

(22) Filed: Oct. 8, 2021

(65) Prior Publication Data

US 2022/0115981 A1 Apr. 14, 2022

Related U.S. Application Data

(60) Provisional application No. 63/197,594, filed on Jun. 7, 2021, provisional application No. 63/089,251, filed on Oct. 8, 2020.

(51) Int. Cl.

| | |
|---|---|
| ***E04F 10/10*** | (2006.01) |
| ***H02S 20/23*** | (2014.01) |
| ***H02S 20/32*** | (2014.01) |

(52) U.S. Cl.

CPC .............. *H02S 20/32* (2014.12); *E04F 10/10* (2013.01); *H02S 20/23* (2014.12)

(58) Field of Classification Search

CPC ........... E04F 10/10; H02S 20/23; H02S 20/32

See application file for complete search history.

(56) References Cited

U.S. PATENT DOCUMENTS 6,039,390 A * 3/2000 Agrawal ........... G02F 1/133308 296/211
6,046,399 A * 4/2000 Kapner ................... F24S 25/16 52/173.3
6,055,089 A * 4/2000 Schulz .................... G02F 1/163 359/275

(Continued)

OTHER PUBLICATIONS

Aldawoud, A. 2013. Conventional fixed shading devices in comparison to an electrochromic glazing system in hot, dry climate, Energy and Buildings, 59, 104-110.

(Continued)

*Primary Examiner* — Beth A Aubrey
(74) *Attorney, Agent, or Firm* — Meunier Carlin & Curfman LLC

(57) ABSTRACT

Systems and methods of use of movable shading devices, are disclosed. In some example implementations, the system can include one or more movable shading devices, where the one or more movable shading devices are configured to be selectively moveable, based on control by a programmable controller, with respect to an external surface of a building or house, where the external surface of the building or house includes at least one wall surface and at least one roof surface, to conserve at least one of cooling energy use associated with the building or house and/or heating energy use associated with the building or house.

20 Claims, 22 Drawing Sheets

(56) References Cited

U.S. PATENT DOCUMENTS

| | | | | |
|---|---|---|---|---|
| 6,798,158 | B2 * | 9/2004 | Evans | E04F 10/0659<br>160/59 |
| 9,664,976 | B2 * | 5/2017 | Rozbicki | H02J 50/12 |
| 10,024,579 | B1 * | 7/2018 | Govar | F24S 25/10 |
| 10,072,458 | B2 * | 9/2018 | Mullet | E06B 9/368 |
| 10,253,564 | B2 * | 4/2019 | Hebeisen | F24F 11/62 |
| 10,601,363 | B1 * | 3/2020 | Rubin | H02S 20/23 |
| 10,683,979 | B2 * | 6/2020 | Gardiner | G02B 5/04 |
| 10,938,337 | B1 * | 3/2021 | Carleton | E04B 1/3445 |
| 11,349,431 | B1 * | 5/2022 | Cerullo | F24S 20/50 |
| 11,429,073 | B2 * | 8/2022 | Berman | E06B 9/24 |
| 11,887,312 | B2 * | 1/2024 | Fiala | G06T 7/277 |
| 2005/0200937 | A1 * | 9/2005 | Weidner | G02F 1/163<br>359/275 |
| 2009/0027759 | A1 * | 1/2009 | Albahri | B60J 3/04<br>359/601 |
| 2009/0120016 | A1 * | 5/2009 | Hon | H02S 20/00<br>52/173.3 |
| 2009/0320898 | A1 * | 12/2009 | Gumm | F24S 25/61<br>136/245 |
| 2010/0018571 | A1 * | 1/2010 | Placer | F24S 25/63<br>136/251 |
| 2010/0065108 | A1 * | 3/2010 | West | H02S 20/23<br>136/251 |
| 2010/0193013 | A1 * | 8/2010 | Kong | H02S 20/30<br>136/251 |
| 2010/0269888 | A1 * | 10/2010 | Johnston, Jr. | H02S 20/23<br>136/251 |
| 2010/0324962 | A1 * | 12/2010 | Nesler | G06Q 50/163<br>705/412 |
| 2012/0138549 | A1 * | 6/2012 | Choi | H02S 20/30<br>211/41.1 |
| 2014/0198371 | A1 * | 7/2014 | Conklin | G02F 1/157<br>359/275 |
| 2015/0168003 | A1 * | 6/2015 | Stefanski | F24F 11/64<br>165/268 |
| 2016/0085130 | A1 * | 3/2016 | Timofejevs | E06B 9/40<br>359/275 |
| 2017/0130520 | A1 * | 5/2017 | Cornelissen | H02S 40/38 |
| 2017/0336104 | A1 * | 11/2017 | Tenghoff | E04F 10/00 |
| 2018/0102734 | A1 * | 4/2018 | Katz | E04F 10/06 |
| 2018/0129172 | A1 * | 5/2018 | Shrivastava | G05B 13/0265 |
| 2018/0301578 | A1 * | 10/2018 | Rozbicki | G02F 1/163 |
| 2019/0036480 | A1 * | 1/2019 | Barr | H02S 30/10 |
| 2019/0267933 | A1 * | 8/2019 | Janowski | E06B 3/66 |
| 2019/0284871 | A1 * | 9/2019 | Papamichael | E06B 9/262 |
| 2019/0341878 | A1 * | 11/2019 | Watson | F24S 25/632 |
| 2019/0386606 | A1 * | 12/2019 | Raghunathan | H02S 20/26 |
| 2020/0076359 | A1 * | 3/2020 | Bahn | H02S 20/30 |
| 2020/0295700 | A1 * | 9/2020 | Vaidyanathan | H02S 20/23 |
| 2020/0321904 | A1 * | 10/2020 | Petrachi | H02S 30/10 |
| 2020/0395885 | A1 * | 12/2020 | Janowski | E06B 3/4415 |
| 2021/0242823 | A1 * | 8/2021 | Cohenmeyer | H02S 20/30 |
| 2022/0111744 | A1 * | 4/2022 | Ohno | H02S 20/24 |
| 2022/0251835 | A1 * | 8/2022 | Vervisch | E04F 10/10 |
| 2022/0271703 | A1 * | 8/2022 | Mensink | H01L 31/048 |
| 2022/0372764 | A1 * | 11/2022 | Wang | E04F 10/10 |
| 2023/0139451 | A1 * | 5/2023 | Krarti | E06B 9/38<br>49/25 |

OTHER PUBLICATIONS

Ashrae, ANSI/ASHRAE/IES. Standard 90.2-2018 Energy-Efficient Design of Low-Rise Residential Buildings, American Society of Heating, Refrigeration and Air-Conditioning Engineers, Atlanta, GA, 2018.

Babaizadeh, H., Haghighi, N., Asadi, S., Broun, R., and Riley, D. 2015. Life cycle assessment of exterior window shadings in residential buildings in different climate zones. Building and Environment, 90, 168-177.

Cho, J., Yoo, C., and Kim, Y. 2014. Viability of exterior shading devices for high-rise residential buildings: Case study for cooling energy saving and economic feasibility analysis. Energy and Buildings, 82, 771-785.

David, M., Donn, M., Garde, F., and Lenoir, A. 2011. Assessment of the thermal and visual efficiency of solar shades, Building and Environment, 46(7), 1489-1496.

Hammad, F., and Abu-Hijleh, B. 2010. The energy savings potential of using dynamic external louvers in an office building. Energy and Buildings, 42, 1888-1895.

Hassan, M.A., Shebl, S.S., and Ibrahim, E.A., 2011, Modeling and validation of the thermal performance of an affordable, energy efficient, healthy dwelling unit. Building Simulation, 4, 255.262.

Hoffmann, S., Lee, S.E., McNeil, A., Fernandes, L., Dragan Vidanovic, D., and Thanachareonkit, A. 2016. Balancing daylight, glare, and energy-efficiency goals: An evaluation of exterior coplanar shading systems using complex fenestration modeling tools, Energy and Buildings, 111, 279-298.

Idchabani, R., El Ganaoui, M., and Sick, F. 2017. Analysis of exterior shading by overhangs and fins in hot climate. Energy Procedia, 139, Dec. 2017, pp. 379-384.

Kim, G., Hong, S.L., Tae, S.L., Schaefer Laura, S., and Taidim Jeong, T. 2012. Comparative advantage of an exterior shading device in thermal performance for residential buildings, Energy and Buildings, 46, 105-111.

Kim, H., and Clayton, M.J. 2020. Parametric behavior maps: A method for evaluating the energy performance of climate-adaptive building envelopes, Energy and Building, 219, 110020.

Konstantoglou, M., and Tsangrassoulis, A. 2016, Dynamic operation of daylighting and shading systems: a literature review, Renewable and Sustainable Energy Reviews, 60, 268-283.

Krarti, M. 2020. Evaluation of Energy Performance of Dynamic Overhang Systems for US Residential Buildings, submitted for Buildings and Energy Journal.

Loonen, R. C.G.M., Favoino, F., Hensen, J.L.M., and Overend, M., 2017. Review of current status, requirements and opportunities for building performance simulation of adaptive facades. Journal of Building Performance Simulation, 10:2, 205-223.

Loutzenhiser, P.G., Maxwell, G.M., and Manz, H. 2007. An empirical validation of the daylighting algorithms and associated interactions in building energy simulation programs using various shading devices and windows, Energy, 32, 1855-1870.

Meldem, R., and Winkelmann, F. 1998. Comparison of DOE-2 with temperature measurements in the Pala test houses. Energy and Buildings, 27(1), 69-81.

Nielsen, M.V., Svendsen, S., and Jensen, L. B. 2011. Quantifying the potential of automated dynamic solar shading in office buildings through integrated simulations of energy and daylight, Solar Energy, 85(5), 757-768.

Nrel, National Solar Radiation Database 1991-2010 Update, (2012). https://rredc.nrel.gov/solar/old_data/nsrdb/1991-2010/.

S. Cho, S. Ray, P. Im, H. Honari, J. Ahn, Methodology for energy strategy to prescreen the feasibility of Ground Source Heat Pump systems in residential and commercial buildings in the United States, Energy Strateg. Rev. 18 (2017) 53.62. https://doi.org/10.1016/j.esr.2017.09.012.

SAM. 2020. Solar Advisor Module. Analysis tool for Solar Distributed Generation Systems, National Renewable Energy Laboratory, Golden, CO. https://sam.nrel.gov/.

Machokostas, A., and Madamopoulos, N. 2016. Quantification of energy savings from dynamic solar radiation regulation strategies in office buildings, Energy and Buildings, 122, 140-149.

* cited by examiner

Receive information representing building modeling information and climate information

1404

Based on the information representing building modeling information and climate information, determine a schedule representing the position of one or more shades, MPVISDs and/or switchable insulation systems

1406

Control one or more MPVISDs and/or switchable insulation systems based on the schedule representing the position of the one or more MPVISDs

*FIG. 14*

SYSTEMS AND METHODS FOR CONSERVING THERMAL AND ELECTRICAL ENERGY USAGE IN BUILDINGS AND HOUSES

CROSS-REFERENCE TO RELATED APPLICATIONS

This application claims priority to, and the benefit of, U.S. provisional patent application No. 63/197,594, filed on Jun. 7, 2021. This application also claims priority to, and the benefit of, U.S. provisional patent application No. 63/089,251 filed Oct. 8, 2020. The disclosures of each of the above-referenced provisional patent applications are expressly incorporated herein by reference in their entireties.

BACKGROUND

Significant portions of the total US electricity use and natural gas demand are consumed by residential buildings. In particular, space heating and cooling make up more than half of the annual energy use of US residential sector. Heat losses and gains from the envelope contribute substantially to the heating and cooling energy needs of residential buildings.

"Cool roof" systems, or reflective roofs, refer to technologies designed to reduce cooling thermal loads particularly in hot climates. Cool roofs, typically with high solar reflectance and thermal emittance, reflect most of the received as well as the absorbed solar radiation fluxes back to the sky resulting in less heat dissipation through the roof. Dynamic cool roof systems may be advantageous alternatives to static cool roofs, for the advantage of eliminating heating penalties. A thermochromic coating, that can control optical properties based on temperature variation, may be used for variable reflective materials including cool roofs.

Building integrated photovoltaics (BIPVs) act as an additional layer to the building element and generate on-site electricity. Existing shading systems generally are static in nature and do not change their geometric features and/or optical properties throughout the year. Movable shading devices may enhance the energy performance and indoor visual comfort. Movable PV integrated shading devices (MPVISDs) can offer the additional benefit of converting solar radiation, otherwise wasted, to electricity that can be used on-site and hence help mitigating $CO_2$ emissions. Also, optimized controls for movable PV-integrated shading devices (MPVISDs) may minimize thermal loads and maximize electricity generation.

It is with respect to these and other considerations that certain embodiments of the present disclosure are presented.

SUMMARY

In the present application, according to some example embodiments, a system includes: one or more movable shading devices, where the one or more movable shading devices are configured to be selectively moveable, based on control by a programmable controller, with respect to an external surface of a building or house. The external surface of the building or house includes at least one wall surface and at least one roof surface, and is configured such as to conserve at least one of cooling energy use associated with the building or house and/or heating energy use associated with the building or house.

According to another aspect, and according to some example embodiments, a system includes: one or more movable shading devices that include at least one photovoltaic (PV) panel. The system also includes a cool roof. The cool roof is a static cool roof or a dynamic cool roof and is configured to reflect at least part of incoming solar radiation. The system also includes a switchable insulation system (SIS), where the SIS is disposed in an attic and/or in one or more walls of a building or house.

According to another aspect, and according to some example embodiments, a method of conserving cooling energy use and/or heating energy use for a building or house includes: controlling, by a programmable controller, positional movement of one or more movable shading devices with respect to at least some of a roof of a building or house and/or external sides of the building or house, wherein at least one of the shading devices comprises at least one of a rooftop photovoltaic (PV) panel or a PV-integrated smart glazed panel.

Other aspects and features according to example embodiments of the present disclosure will become apparent to those of ordinary skill in the art, upon reviewing the following detailed description.

BRIEF DESCRIPTION OF THE DRAWINGS

The accompanying figures, which are not necessarily drawn to scale, and which are incorporated in and constitute a part of this specification, illustrate several aspects described below.

FIG. 1A illustrates a perspective view of the tiltable solar panel, and FIG. 1B illustrates a side view of the tiltable solar panel.

FIG. 2A illustrates how the angle of the tilt can be measured with respect to an exterior surface of a building. FIGS. 2B-2E illustrate perspective views of a tiltable solar panel with different amounts of tilt.

FIG. 4A illustrates the sliding and rotating panel in one position, and FIG. 4B illustrates the sliding and rotating panel moved to another position by both sliding and rotating.

FIGS. 8A-8B show a system with MPVIDS and cool roof technologies, in accordance with one or more embodiments of the present disclosure.

FIG. 9A illustrates the system at 9 AM, FIG. 9B illustrates the system at 12 PM, and FIG. 12C illustrates the system at 3 PM.

FIG. 10A illustrates a deployment on top of a roof. FIG. 10B illustrates a "half-shade" deployment. FIG. 10C illustrates a "a full shade deployment."

FIG. 11A illustrates an MPVISD deployment on top of a roof. FIG. 11B illustrates a half-shade deployment of an MPVISD. FIG. 11C illustrates a full shade deployment of an MPVISD.

FIG. 12A illustrates the SIS in a fully closed position and FIG. 12B illustrates the SIS in a fully opened position.

FIG. 14 is a flow diagram of a method of controlling an embodiment of the present disclosure including switchable insulation systems.

DETAILED DESCRIPTION

Figure 1A:
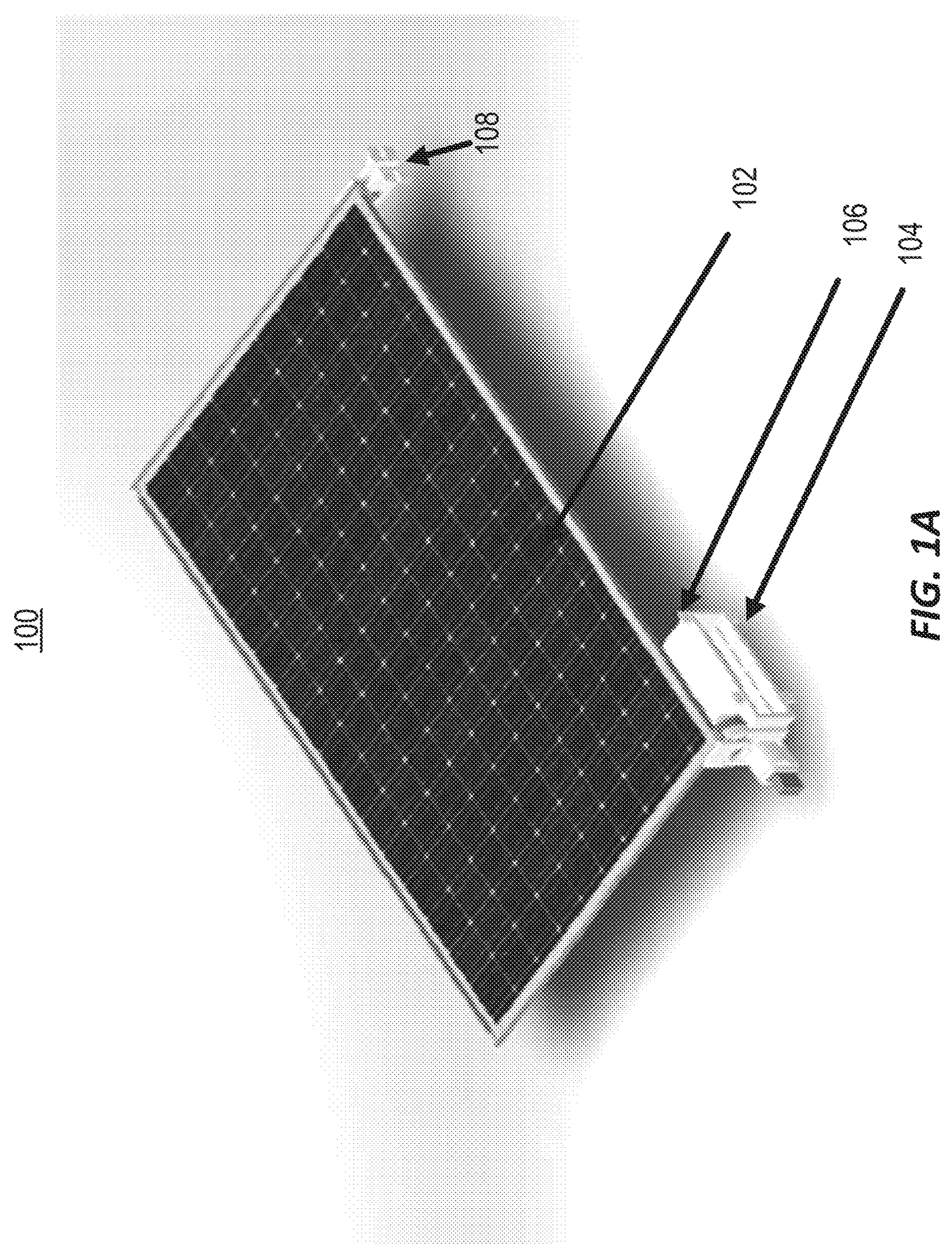
FIGS. 1A-1B illustrate a tiltable solar panel in accordance with one or more embodiments of the present disclosure.

Although example embodiments of the present disclosure are explained in detail herein, it is to be understood that other embodiments are contemplated. Accordingly, it is not intended that the present disclosure be limited in its scope to the details of construction and arrangement of components set forth in the following description or illustrated in the drawings. The present disclosure is capable of other embodiments and of being practiced or carried out in various ways.

It must also be noted that, as used in the specification and the appended claims, the singular forms "a," "an" and "the" include plural referents unless the context clearly dictates otherwise. Certain values may be expressed in terms of ranges "from" one value "to" another value. When a range is expressed in terms of "from" a particular lower value "to" a particular higher value, or "from" a particular higher value "to" a particular lower value, the range includes the particular lower value and the particular higher value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more components in a device or system does not preclude the presence of additional components or intervening components between those components expressly identified.

Some experimental data may be presented herein for purposes of illustration and should not be construed as limiting the scope of the disclosed technology in any way or excluding any alternative or additional embodiments.

In some aspects, the present disclosure relates to a system with a sliding and/or rotating overhang that can include photovoltaic arrays and that can be applied to windows for commercial and/or residential buildings. In one embodiment, an overhang is slidable in a lateral motion such that it can be positioned on top of a window to act as a shading device remaining set at the same angle position throughout the year. In another embodiment, an overhang is slidable in a lateral motion and is also rotatable to a desired angle, and can be rotated when positioned on top of a window or in a position off the window.

Some embodiments of the present disclosure have integrated PV arrays with sliding overhangs that can both generate electricity and reduce heating and cooling thermal loads for residential buildings. Basic control to operate the sliding overhangs can be considered to minimize annual net energy demands with and without the integrated PV arrays. When integrated with PV modules, sliding overhangs according to some embodiments of the present disclosure can significantly reduce the energy demand for housing units, especially when they are set at the optimal angles specific to the building location to maximize their electricity generation and solar shading effects. Throughout the present disclosure, it should be understood that the terms PV panel, "integrated PV array," "photovoltaics" and "solar panel" are used interchangeably to refer to devices that generate electrical energy when they are illuminated.

Figure 1B:
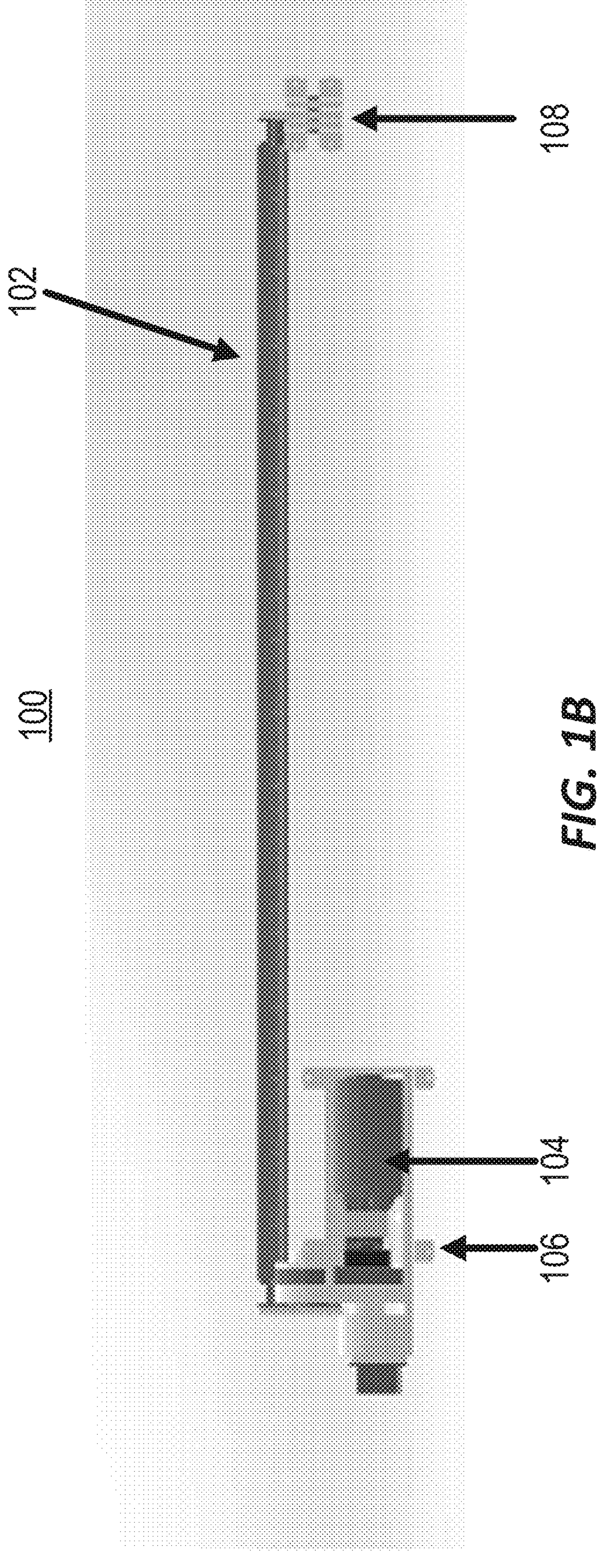

As shown in FIG. 1A, embodiments of the present disclosure can include a dynamic shade 100 that includes a PV panel 102 on one or both sides of the shade 100. A motorized actuator 104 includes a motor attachment bracket 106 that is configured to attach to a building or track (not shown) at an attachment point on the building (not shown). The attachment point on the building can be a point on the wall of the building, the roof of the building, a window of the building, or another structure (e.g. a sliding track) affixed to the building. Additionally, the shade 100 can include one or more shade attachment brackets 108 that connect the shade 100 to the building (not shown). The present disclosure contemplates that one shade 100 can include more than one motorized actuator 104, and that the motorized actuator 104 and shade 100 can be attached to the building or track using any suitable attachment system. FIG. 1B shows a side view of the shade 100 illustrated in FIG. 1A, including the motor attachment bracket 106 and shade attachment bracket 108.

In some embodiments, overhangs can have integrated monofacial or bi-facial photovoltaic (PV) array panels to generate electricity; the electrical power produced by the PV array integrated with the sliding overhang can be used directly to meet the energy needs for a building and can feed excess power to a grid. The present disclosure contemplates that any PV panel suitable for roof installation can be used for the MPVISD (movable PV integrated shading device) including common PV modules that are opaque or PV-integrated smart glazed panels (i.e., electrochromic or other glazing systems that can switch between clear and tinted states).

The shade 100 is configured so that the motorized actuator 104 can tilt the shade 100 relative to a surface of a building and that the motorized actuator 104 can maintain the tilt for a predetermined period of time, for example a set number of minutes, hours, or days. Alternatively, the motorized actuator 104 can be configured to change the tilt of the shade 100 throughout the day based on a control input from one or more controllers, or in response to a user input (e.g. a user input into the controller).

Figure 2A:
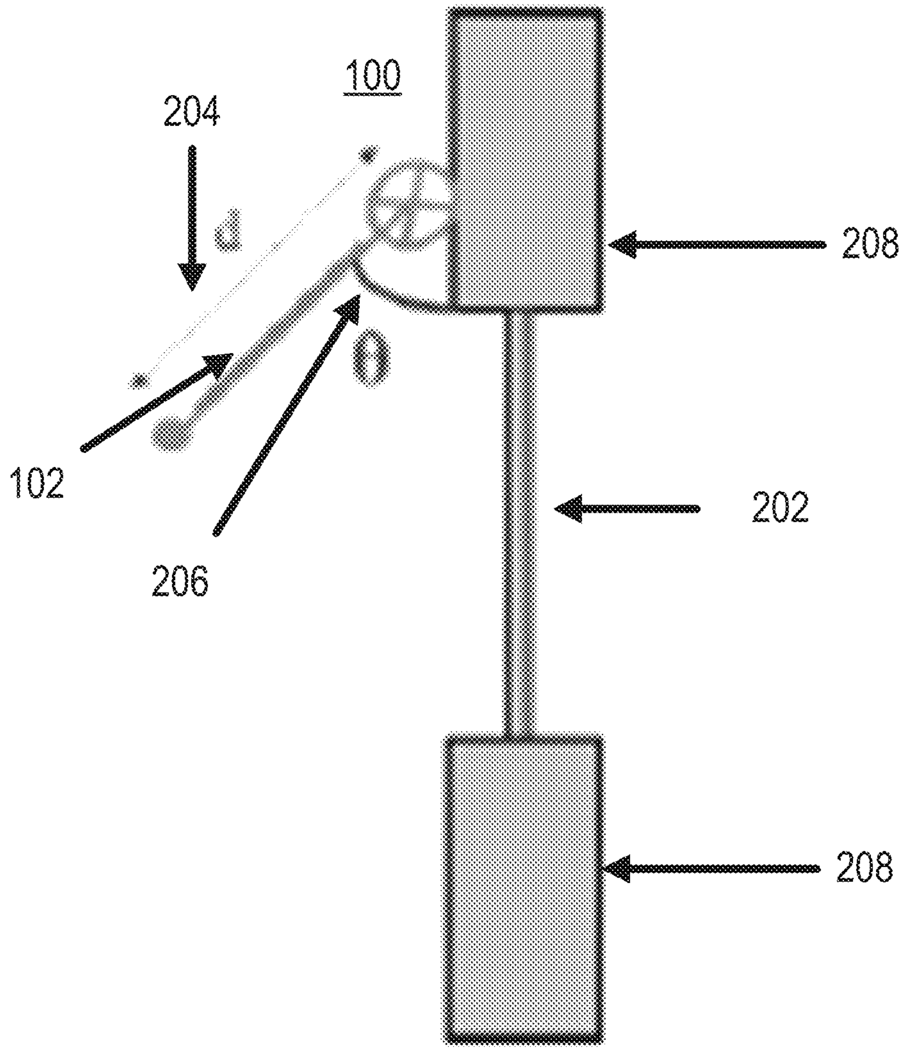
FIGS. 2A-2E illustrate tiltable solar panels attached to the exterior of a building, in accordance with one or more embodiments of the present disclosure.

FIG. 2A illustrates a side-view schematic of a dynamic shade 100 with a PV panel 102 attached to a building above a window 202. The dynamic shade 100 has a length "d" 204 and forms an angle θ 206 between the underside of the shade 100 (i.e. the side opposite the PV panel 102) and the wall 208 of the building. The motorized actuator 104 and/or controller can be configured to dynamically control the angle θ 206. Similarly, the measurement "d" 204 can be a controller input, along with parameters about the wall 208 and windows of the building.

Figure 2B:
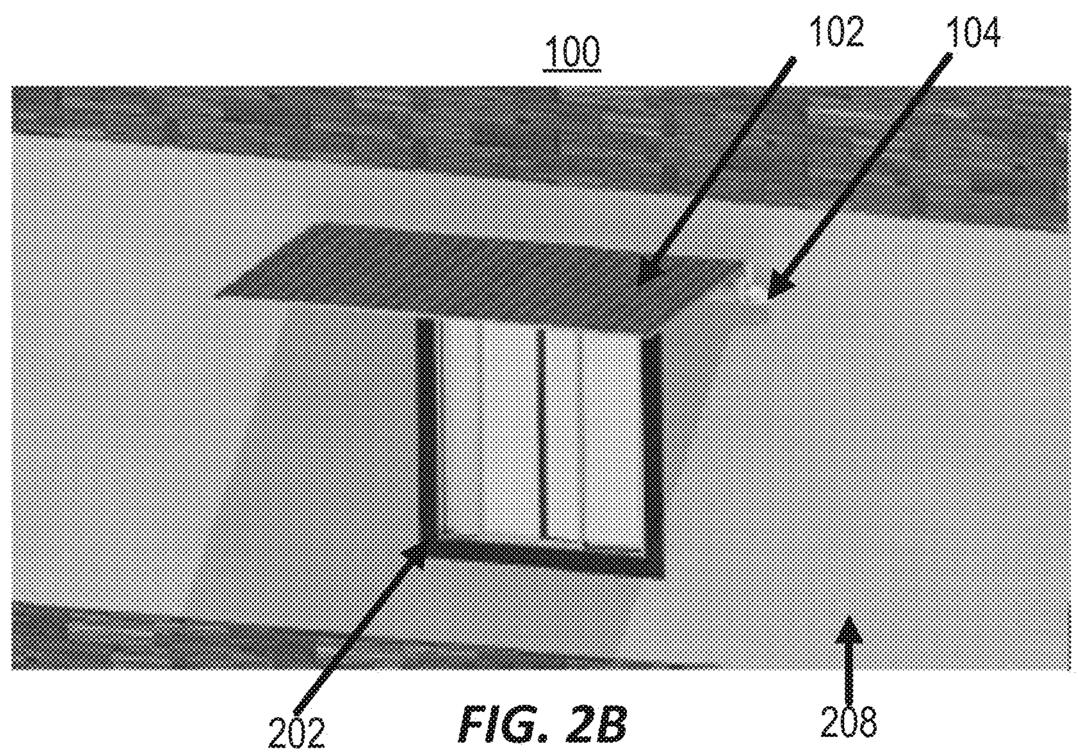
Figure 2C:
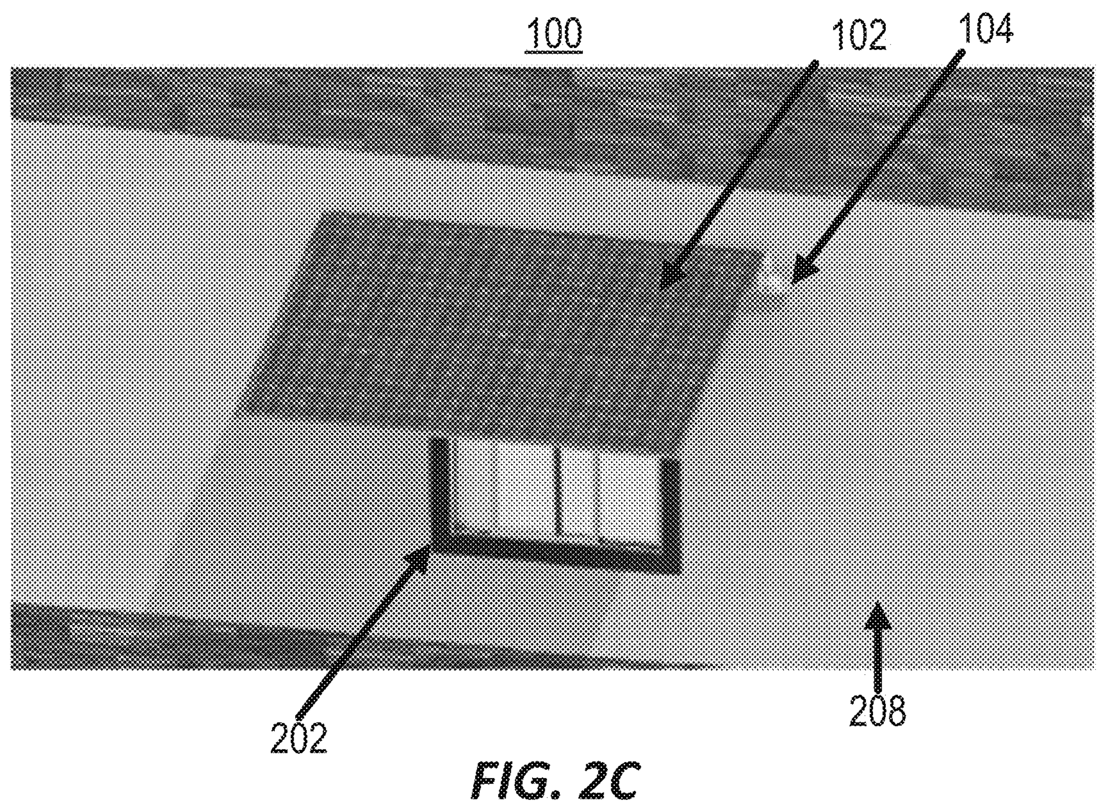
Figure 2D:
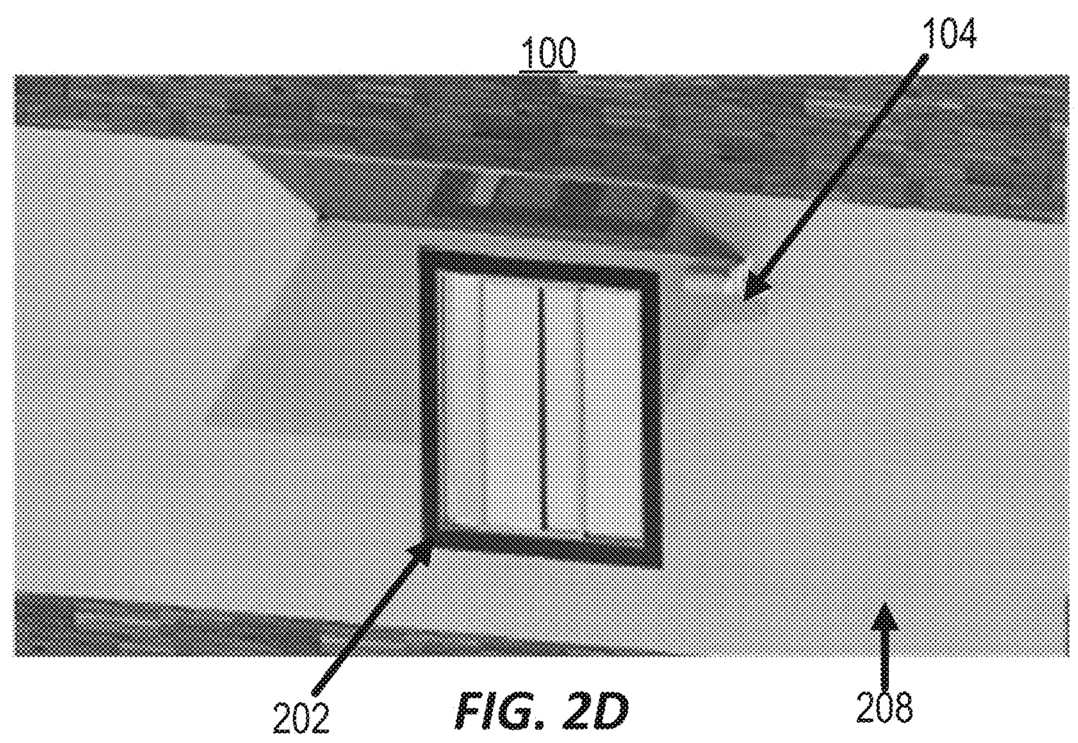
Figure 2E:
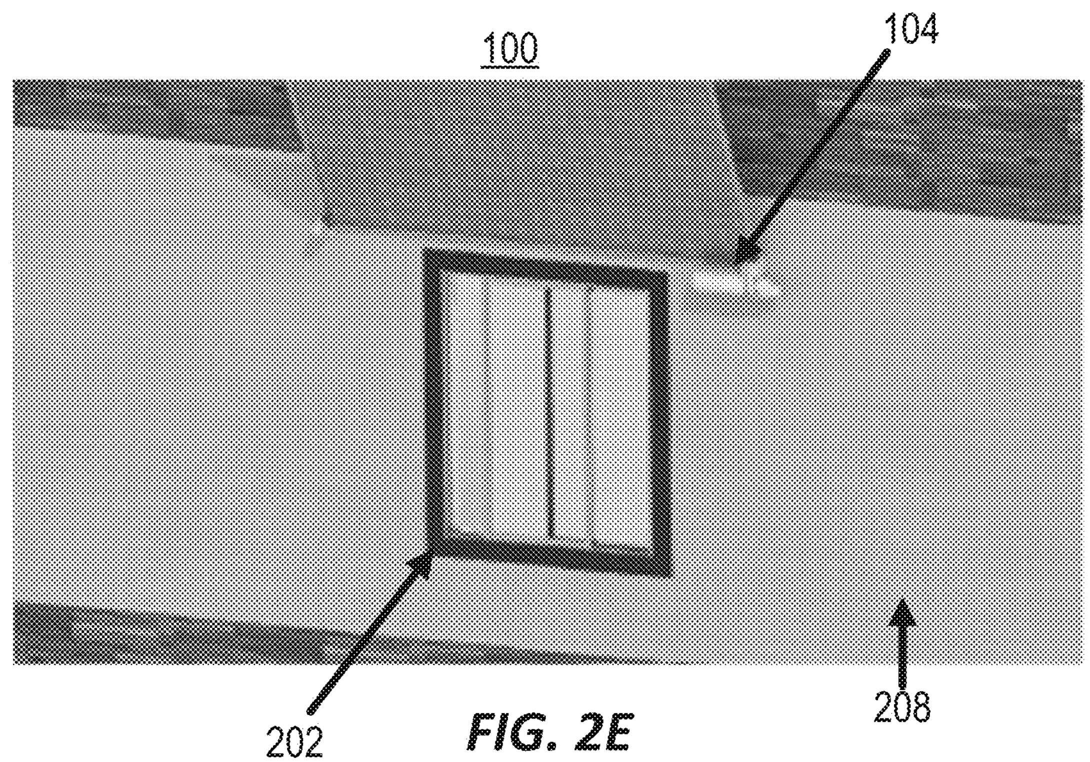

FIGS. 2B-2E illustrate perspective views of different positions of a dynamic shade 100. Different shade positions have different effects, and the effects of a given shade position can be based on the climate, the position and intensity of the sun, and whether or not the shade includes a PV panel, for instance. FIG. 2B illustrates a shade with a θ of about 90 degrees. As shown in FIG. 2B, that shade position results in the window being mostly shaded. FIG. 2C shows a shade 100 where θ is less than 90 degrees, also resulting in the window being mostly shaded, and partially blocking the window. FIG. 2D shows a shade with a θ of greater than 90 degrees, where the window is uncovered, and also only partially shaded. Finally, FIG. 2E shows a shade 100 with a θ of much greater than 90 degrees, where the window is entirely unshaded. Shading can have the effect of keeping heat inside or outside of a building, depending on the ambient conditions. Similarly, as shown in FIGS. 2B-2E, tilting has the effect of exposing different amounts of the PV panel 102 to the sun, which can affect the amount of electricity the PV panel 102 produces. Similarly, a building occupant may wish for the window to be unobstructed for visibility or other purposes. The present disclosure contemplates that different control techniques (such as the control techniques disclosed herein) can be used to dynamically operate the shade 100 to optimize, minimize, or balance these and other factors.

Figure 3:
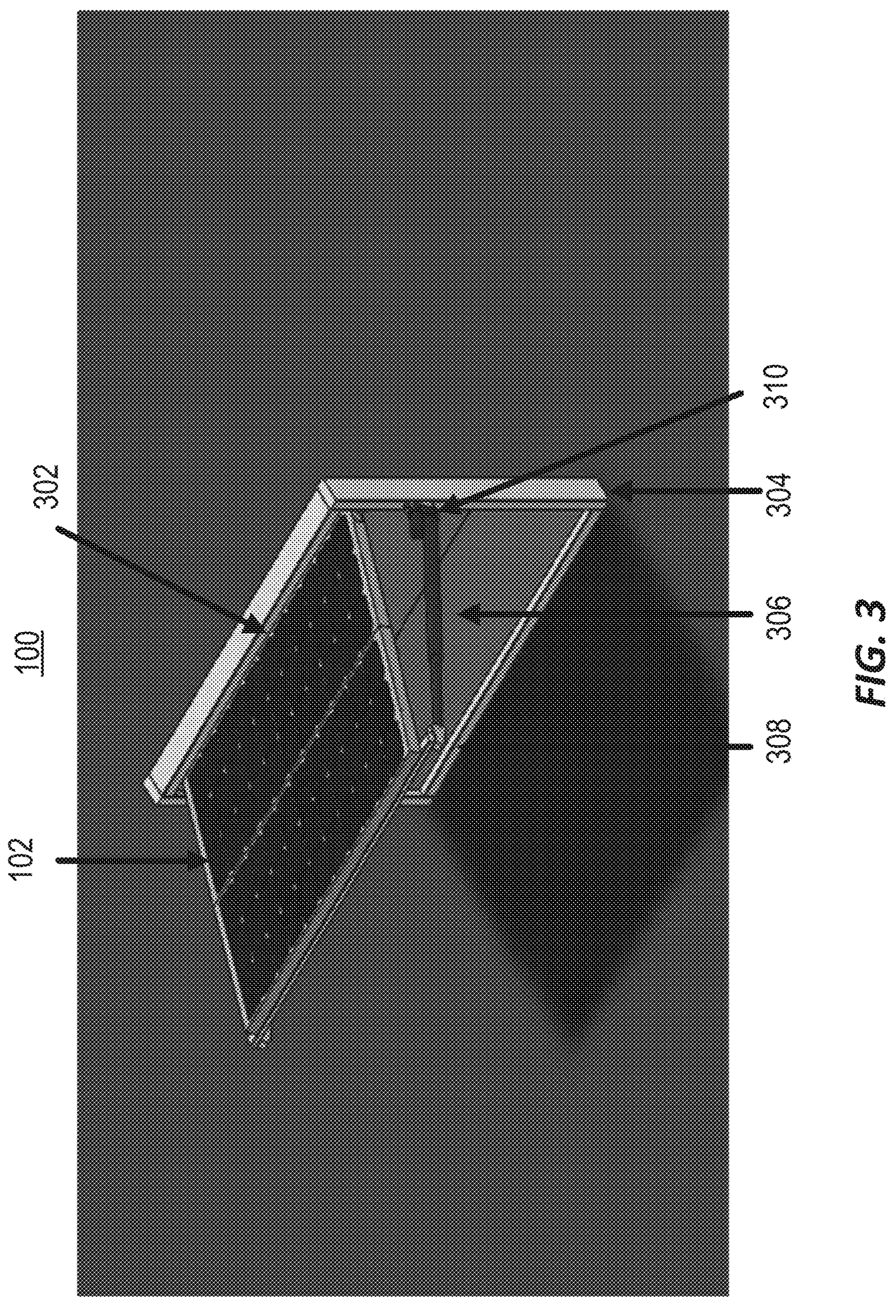
FIG. 3 illustrates a rotating PV panel in accordance with one or more embodiments of the present disclosure.

The present disclosure contemplates that other methods of dynamically moving shades 100 are possible other than those utilizing motorized actuators 104 shown in FIGS. 1-2. The present disclosure also contemplates different types of attachments between the shade 100 and the building. FIG. 3 illustrates an embodiment of the present disclosure where a shade 100 with PV panel 102 includes an edge 302 configured to attach to a frame 304. The shade 100 includes a spring 306 (e.g. a gas spring) which is configured to attach to an attachment point 308 on the shade and an attachment point 310 on the frame 304. The angle of θ (e.g. the angle illustrated in FIG. 2A) can therefore be changed by changing the length of the spring.

Figure 4A:
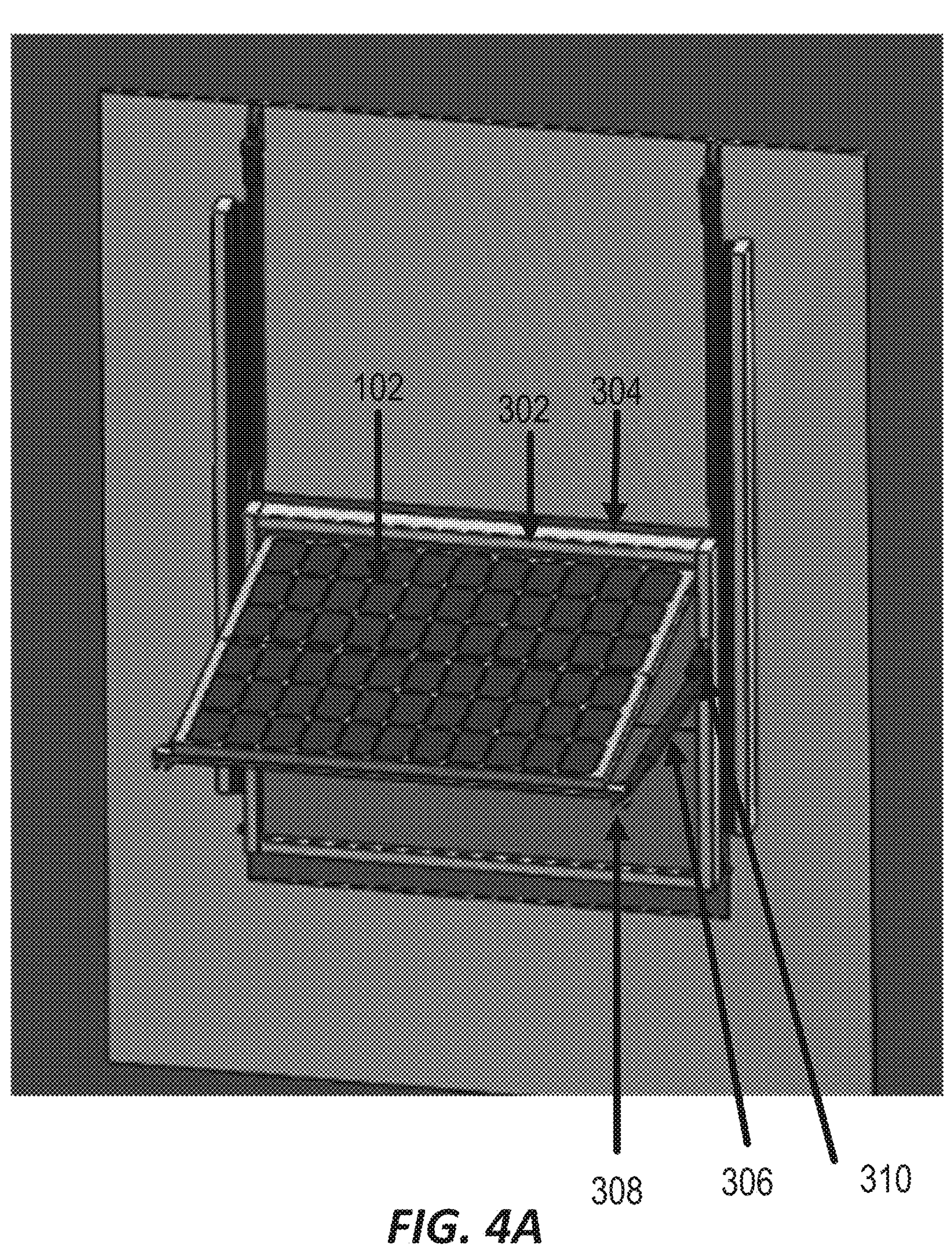
FIGS. 4A-4C illustrate a sliding and rotating PV panel, in accordance with one or more embodiments of the present disclosure.
Figure 4B:
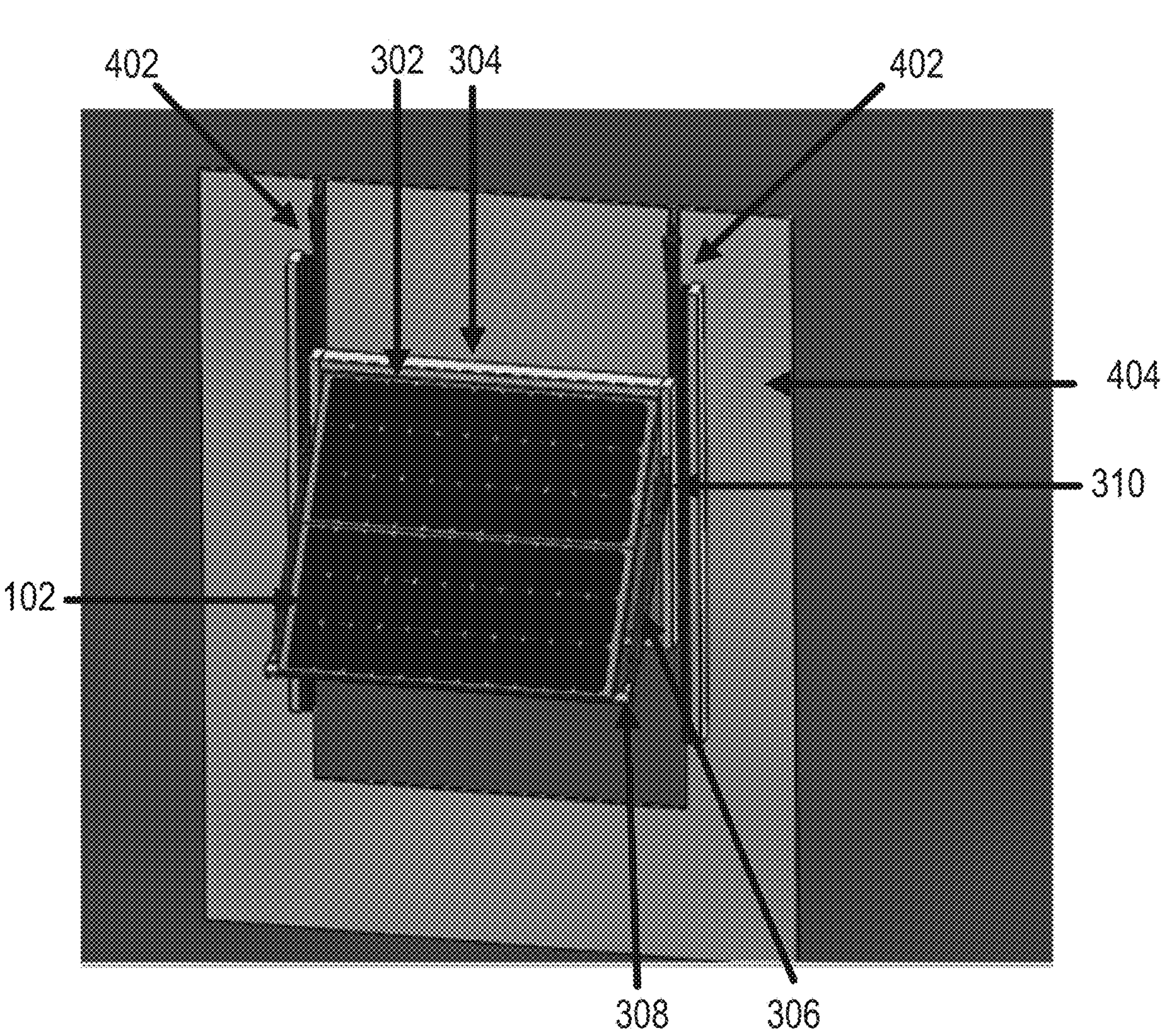
Figure 4C:
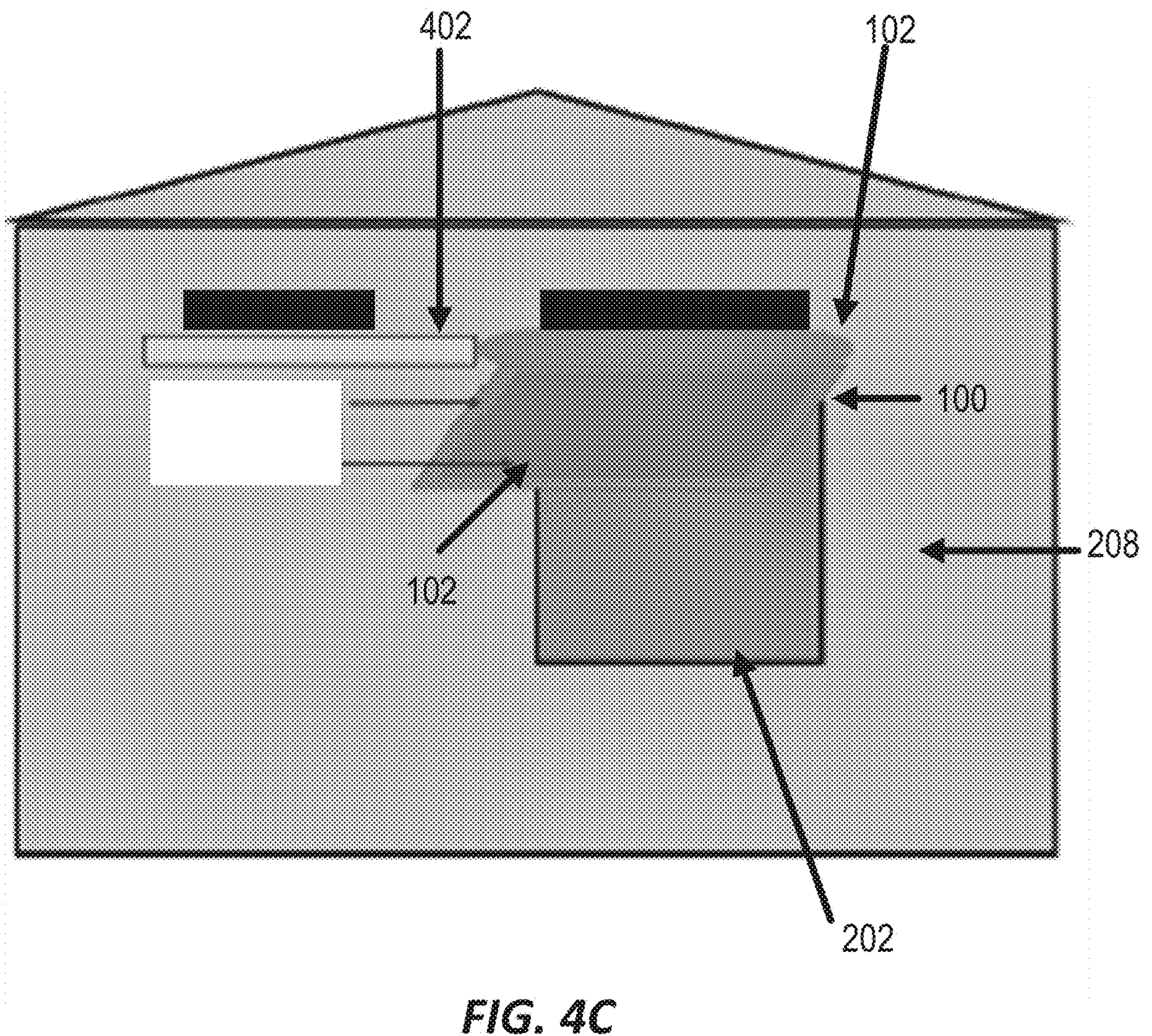

The present disclosure also contemplates that the dynamic shades 100 can be moved along a surface of the building, for example by sliding. FIG. 4A illustrates the embodiment of the present disclosure shown in FIG. 3, where the frame 304 is configured to slide along two parallel rails 402 placed on the exterior surface 404 of a building. The angle θ between the shade and the wall can be controlled independently of the distance that the frame (and the attached panel) slides along the rails. As shown in FIG. 4B, both the tilt of the panel and position of the panel relative to the rails can be dynamically changed. The present disclosure also contemplates that different orientations and numbers of rails can be used in embodiments of the present disclosure. As shown in FIG. 4C, in some embodiments of the present disclosure, the sliding rail can be positioned parallel to the ground. The motor can slide along the horizontal sliding rail. This can allow the system to position the panel at any angle without shading the window, by moving the shade along the sliding rail so that it does not cover the window. It should be understood that the present disclosure contemplates that the rails can have any orientation or position (e.g. not vertical or horizontal).

Figure 5:
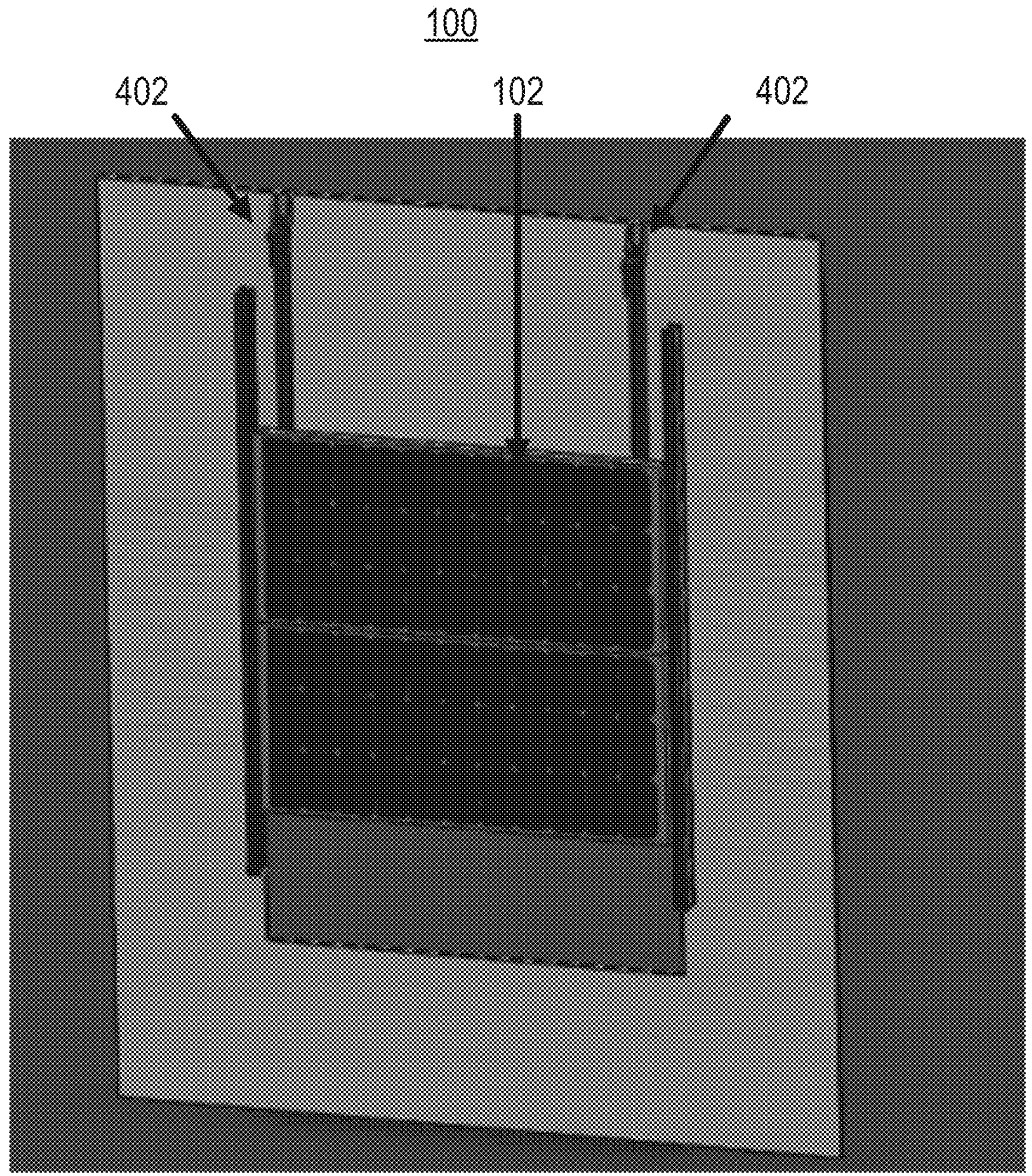
FIG. 5 illustrates a sliding PV panel, in accordance with one or more embodiments of the present disclosure.

In some embodiments of the present disclosure, the shade can be a shade that does not tilt relative to an exterior surface of the building. For example, the shade can be a shade 100 that is slidable in one or more directions, without being tiltable, as shown in FIG. 5. In some embodiments of the present disclosure that include shades 100 that are rotatable, one or more motors 104 can be used to provide for the sliding motion along a rail 402 and to drive angular rotation of the overhang/shade 100. Again, it should be understood that sliding dynamic shades 100 such as the one in FIG. 5 can be made with or without PV panels. It should be understood that throughout the present disclosure "dynamic shade" refers to both shades that tilt relative to the external surface of the building, shades that slide relative to the external surface of the building, and shades 100 that both tilt and slide relative to an external surface of the building.

Figure 6:
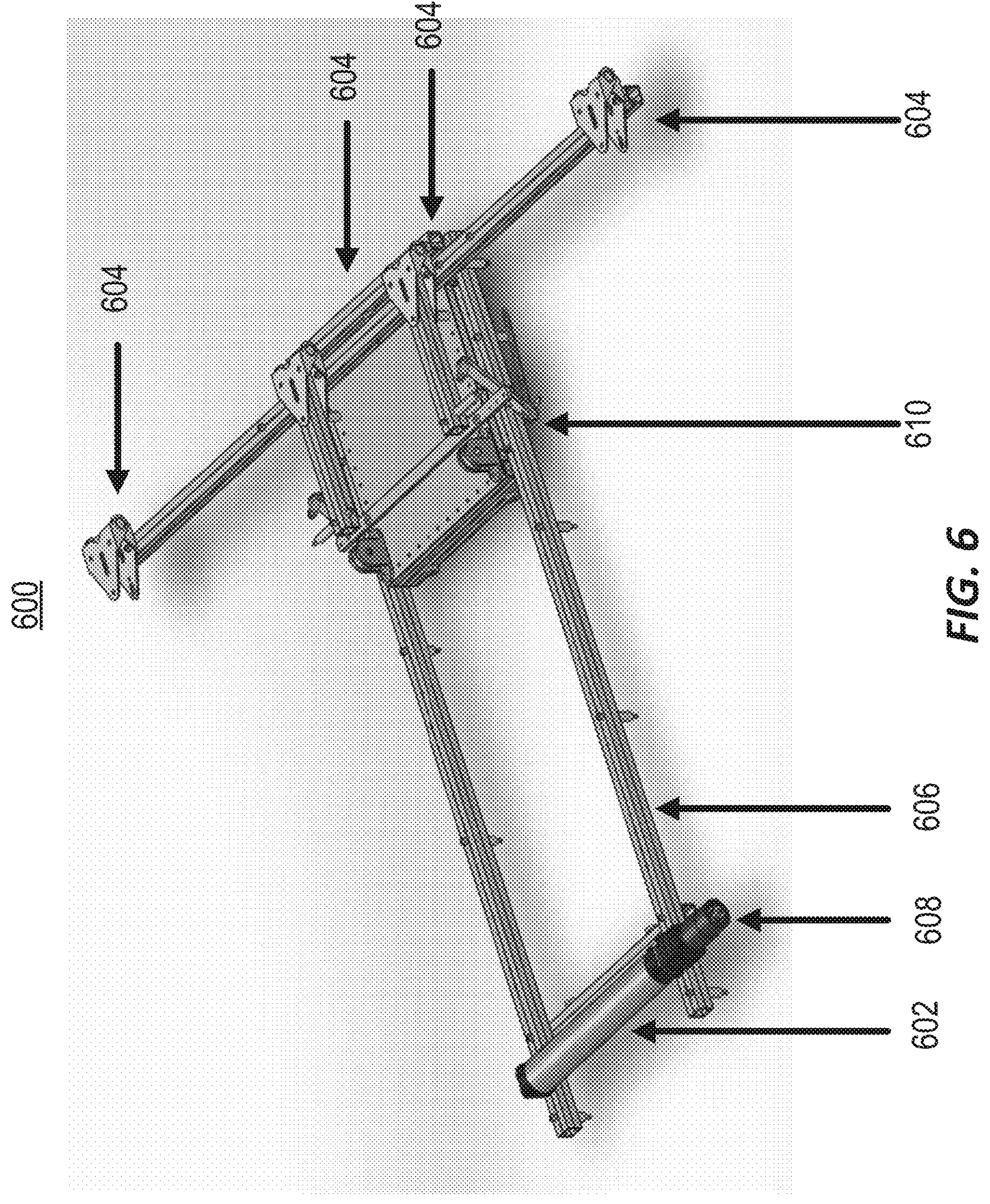
FIG. 6 is a diagram of an MPVISD (movable PV integrated shading device) system using a DC motor with sliding and one-axis rotation capabilities, in accordance with one or more embodiments of the present disclosure.

FIG. 6 is a diagram of an MPVISD system 600 using a DC motor 602 with sliding and one-axis rotation capabilities. In some embodiments of the present disclosure, the shade 100 includes a series of attachment points 604 for a PV panel (not shown), a track 606, and a motorized wheel 608 configured to move the shade 100 along the track 606, as shown in FIG. 6. The MPVISD system 600 can also include a tilting mechanism 610 for tilting the PV panel (not shown) relative to the track 606. It should be understood that the present disclosure contemplates that different numbers and configurations of tracks 606, wheels 608, and attachment points 610 are contemplated by the present disclosure, and that the device illustrated in FIG. 6 is intended only as a non-limiting example.

Motors, Actuators, and Controllers

In accordance with various embodiments of the present disclosure described herein, an MPVISD can use one or more of AC and DC motors, as well as actuators, connected to a controller, to operate the various example implementations and aspects discussed herein. The controller can perform such operation according to a set of rules and/or through scheduled settings. The same or different motors can be used to drive the sliding and rotation movements. The MPVISD can be separate (i.e., a standalone system) or integrated with the PV panels.

The sliding movement can be also achieved by placing of the PV panels into rails with wheels, configured such that the movement can be completed through a motor or even manually. Similarly, the rotation along any of the two axes can be automatic (i.e., with motorized actuators) or manually.

Deploying PV panels on top of a static cool roof system may have different impacts on heating and cooling thermal loads compared to deploying PV on top of a standard non-reflective roof. Installing a PV panel on a standard roof (dark roof) may generally reduce the cooling energy use due to the shading effects. However, its impact on heating energy use may depend highly on the building integrated photovoltaic (BIPV) configuration as well as the climate Adaptive Envelope System (AES)

Figure 7:
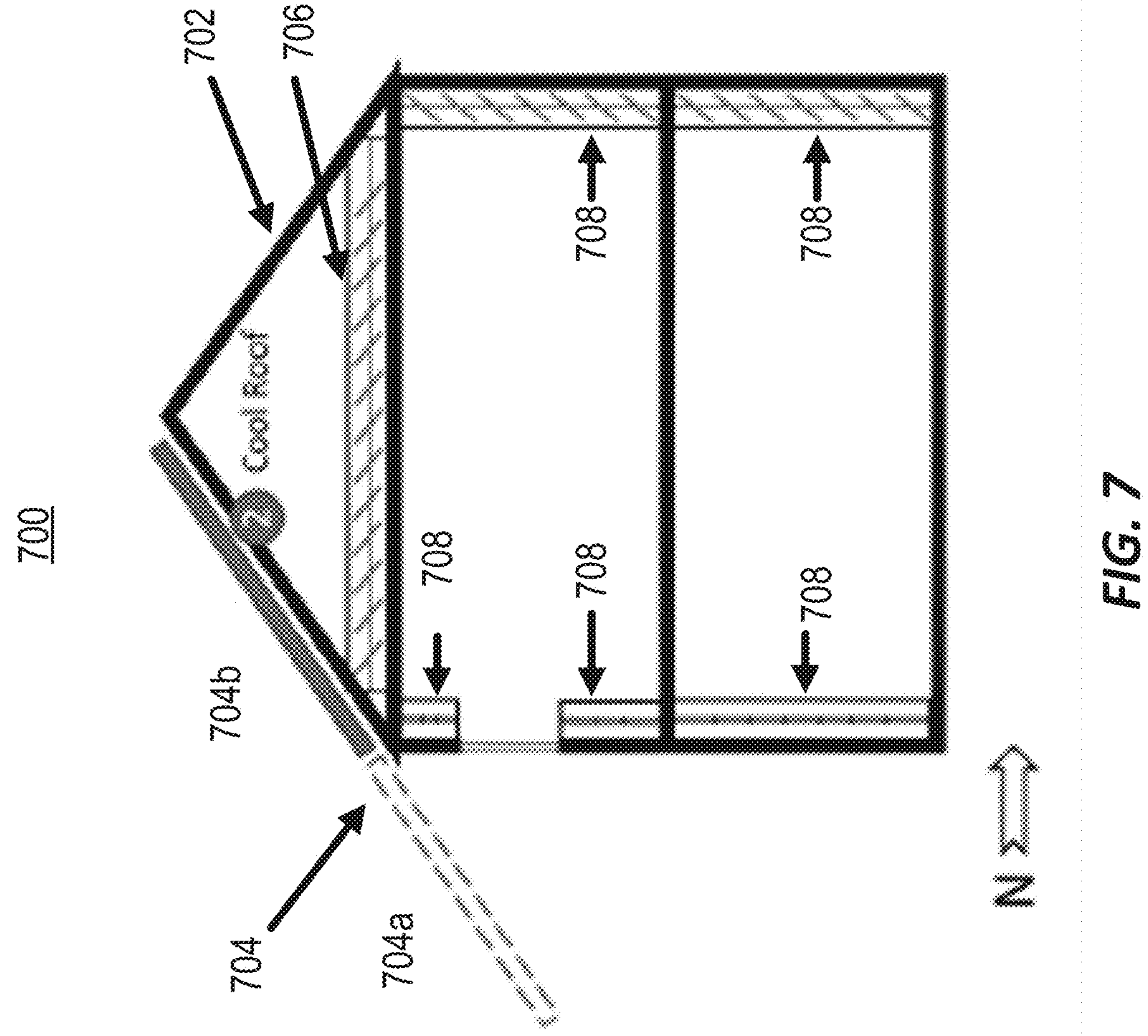
FIG. 7 shows a system in accordance with one or more embodiments of the present disclosure.

With reference to FIG. 7, the following describes a system 700 in accordance with one or more embodiments of the present disclosure. FIG. 7 illustrates an integrated adaptive envelope system (AES) applied to an example schematic of a US home. Three main technologies are involved in this AES, including cool roofs 702, movable PV-integrated shading devices (MPVISDs) 704, and switchable insulation systems (SISs) 706, 708 as illustrated in FIG. 7. The proposed AESs are suitable for homes with pitched roofs 702 (e.g., gable and hipped) as indicated in FIG. 7 but can be also adopted for buildings with flat roofs 702. In some embodiments of the present disclosure the MPVISD system can be modified for use with flat roofs. In some embodiments, the roof 702 is a cool roof 702 with a static reflective coating. However, the AESs according to one or more embodiments of the present disclosure can utilize a dynamic reflective coating. Moreover, a movable PV-integrated shading device 704 can be utilized, which is configured to allow sliding along the roof 702 slope (with an angle of, e.g., 18°) to take two positions 704*a*, 704*b* depending on a predefined control schedule (i.e., positions "(a)" and "(b)") as indicated in FIG. 7 to manage solar heat gains through the windows. In addition, in some embodiments, attic integrated SIS 706 and wall integrated SISs 708 are deployed to switch the thermal resistance of the attic and/or wall assemblies between high and low values according to specific temperature-based rulesets. In some embodiments, the roof 702 of the home is coated with a cool material to reflect the solar radiation and reduce the cooling loads during summer seasons.

As shown in FIG. 7, a movable PV-integrated shading device (MPVISD) 704 is deployed on a roof and configured to switch between positions including a first position 704*a* (partially off the roof) and a second position 704*b* (on top of the roof). In some implementations, during summer the MPVISD 704 is set at the first position 704*a* and acts a shading device and hence has no impact on the roof reflectance. However, during winter, in some embodiments the MPVISD 704 can move to position 704*b* and hence changes the optical properties of the roof since the PV panels now cover a greater portion of the roof.

In the present disclosure, an MPVISD 704 can encompass various types of PV panels without departing from the patentable scope of the present application. For examples and not by way of limitation, the MPVISD(s) 704 can include one or more photovoltaic panels and the one or more photovoltaic panels can include opaque rooftop PV modules or PV-integrated smart glazed panel (e.g., panels utilizing electrochromic aspects and/or glazing systems that can selectively switch between clear and fully opaque or tinted states).

Cool Roofs and Movable PV-Integrated Shading

In some embodiments of the present disclosure, the application of "cool roofs" (see, e.g., the cool roof 702 in FIG. 7) can reduce cooling thermal loads by utilizing highly reflective materials or applying white coatings to the exterior roof surface. Typical cool roofs may have light-colored materials or coatings with low solar absorption and high thermal emittance. The thermal emittance is used to define the rate at which roofs can radiate the absorbed solar radiation and eventually indicate how rapidly it can cool. Static cool roofs (StaticCRs) are can generally be effective in cooling-dominant climates, but they may result in a heating penalty. The heating penalty and the cooling savings associated with StaticCRs can vary with location, insulation level, and building type. The heating penalty can be avoided when considering dynamic cool roof (DynamicCR) systems. Dynamic cool roofs can produce the same heating energy use as standard roofs and the same cooling energy use savings as StaticCRs. In accordance with some embodiments of the present disclosure, a PVISD is designed to make the StaticCR to act as a dynamicCR, since the overall optical properties of the roof change with the MPVISD position. As an example implementation, the dynamic cool roof system may switch between a high reflectance of 0.55 during the cooling season and a low reflectance of 0.3 during the heating season.

Figure 8A:
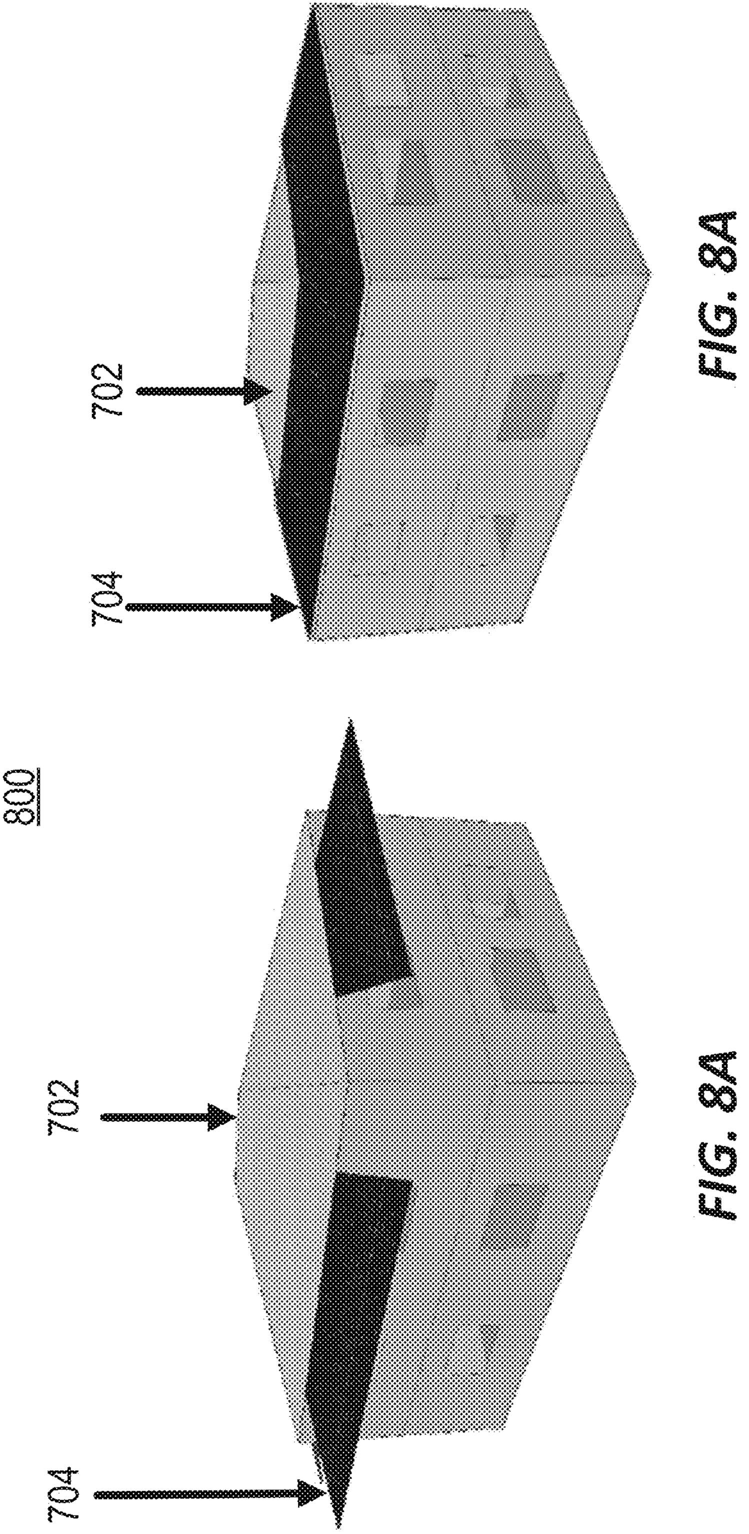

Movable shading devices can reduce the total energy consumption of a residential building. When integrated with PV panels, shading devices can provide the additional benefits of generating electricity that can be used by the building with any excess supplied to the grid. The basic operation scheme of a MPVISD 704 in accordance with one or more embodiments of the present disclosure is illustrated in FIGS. 8A-8B. In particular, during the summer season, the MPVISD is set to shade the windows facing east, south, and west while the cool roof 702 is exposed as shown in FIG. 8B. In this MPVISD 704 position, the cool roof system 702 reflects most of the solar radiation striking the roof surface 702 while the MPVISD 704 shades windows to minimize the cooling thermal needs. In contrast, during the winter season, the MPVISD 704 moves upward covering the roof 702 surface and maintaining the windows unshaded to maximize free solar heat gains as shown in FIG. 8B.

Figures 9A, 9B, 9C:
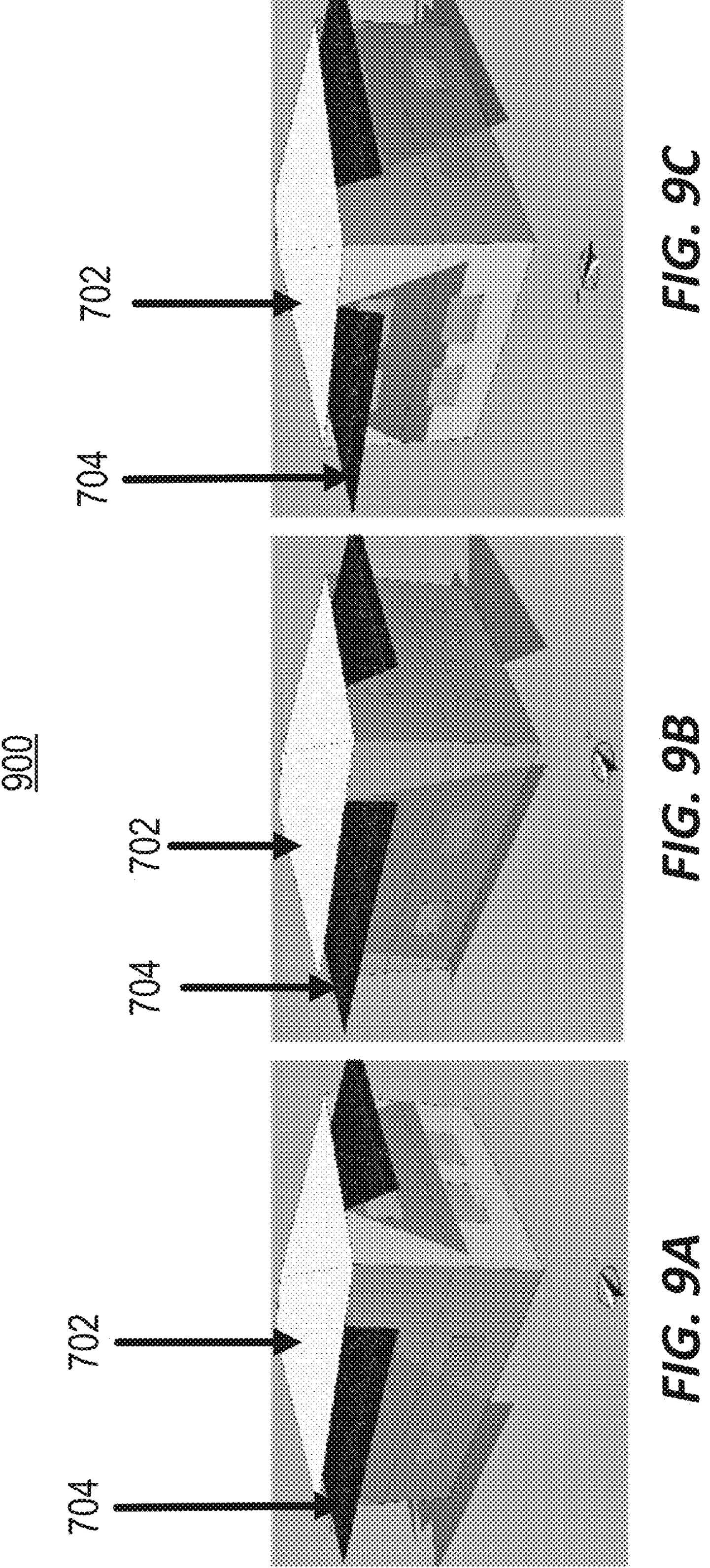
FIGS. 9A-9C show a system utilizing MPVIDS in accordance with one or more embodiments of the present disclosure.

DynamicCRs can be controlled to switch the reflectivity of the roof's surface on seasonal or hourly bases. Optimized control strategies can determine the best roof reflectivity level during each hour. However, an analysis presented herein considers seasonal control options for DynamicCRs, which can be shown to be more effective. Specifically, the MPVISDs 704 according to some embodiments are set to shade the windows and expose the roof to be reflective during the summer season and to be on top of the roof 702 to reduce its overall reflectivity as well as allow full solar heat gains through the windows during the winter season. For example, FIGS. 9A-9C show 3D renderings of a house model 900 illustrating the shadow effects when MPVISDs 704 are deployed at different times of the day during July 21$^{st}$: at 9 AM (FIG. 9A), 12 PM (FIG. 9B), and 3 PM (FIG. 9C).

As described in some detail above, the thermal impact of installing PV on top of cool roofs on heating energy use can depends largely on the BIPV configuration as well as the climate conditions. To account for uncertainty in determining the impact of rooftop PV deployment on heating thermal loads, an analysis in accordance with the present disclosure can consider two extreme scenarios, with the assumption that the actual performance would be between the results obtained for these extreme cases. Specifically, it assumes that the PV panels, when deployed on a static cool roof, can either reduce or increase the heating thermal loads. These two options are accounted for by defining equivalent reflectance values to mimic both possible scenarios. In particular, during the heating season the equivalent roof solar reflectance is set either to be 0.9 or 0.1. The PV electricity output is estimated using EnergyPlus accounting for the MPVISD position, i.e, as BIPV when it is on the rooftop during winter and as a decoupled surface when it acts as a shade device during summer. In some embodiments, the PV panels can be positioned on roof areas of the south, east and west oriented shading devices which are 23.6 $m^2$, 16.4 $m^2$ and 16.4 $m^2$, respectively. The PV modules can be mono-crystalline silicon type with 17.5% efficiency, 290 Wp output and a temperature coefficient of −0.427%/° C.

Figures 10A, 10B, 10C:
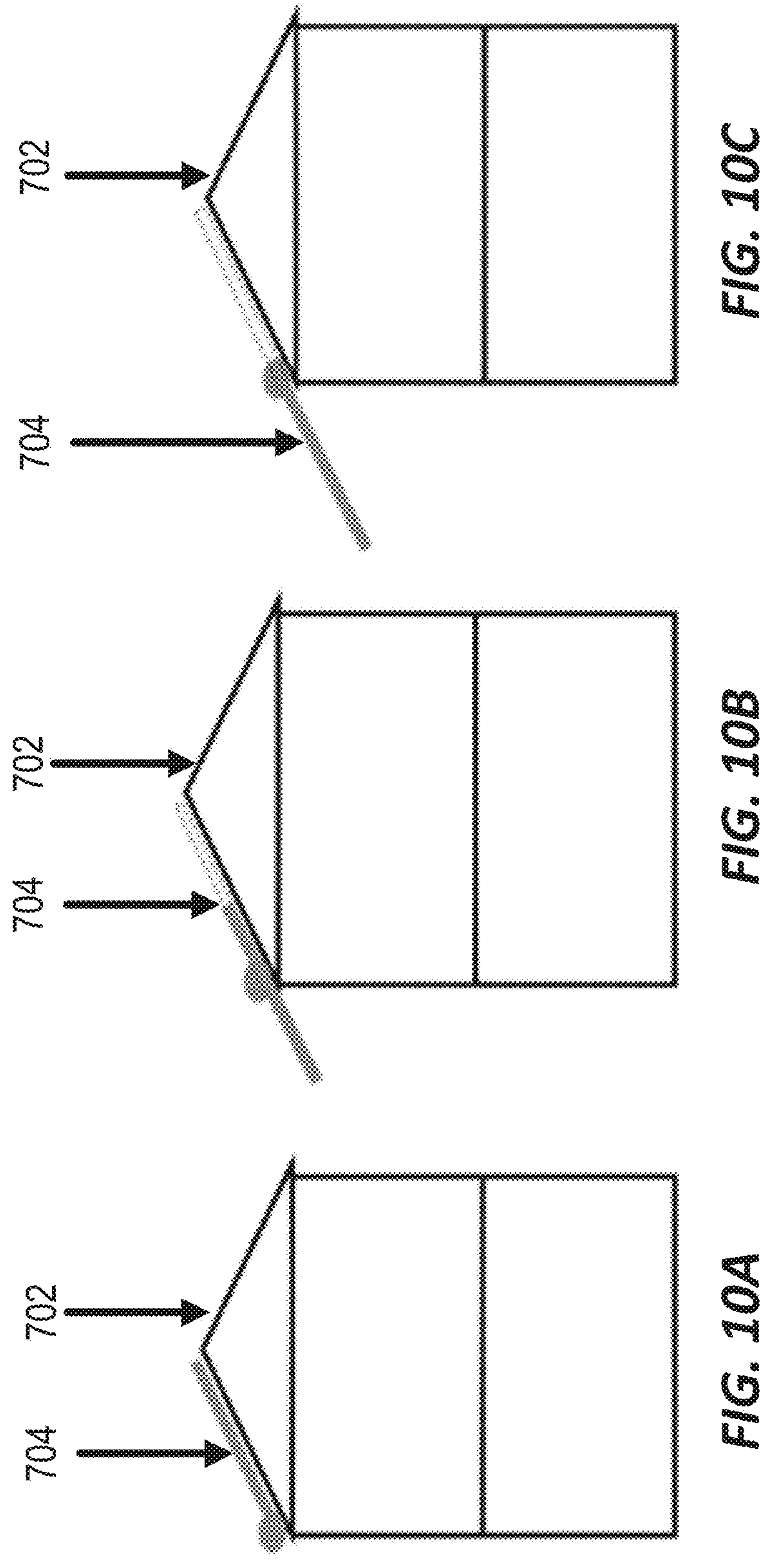
FIGS. 10A-10C show examples of sliding positions for an MPVISD in accordance with one or more embodiments of the present disclosure.

FIGS. 10A-10C show examples of sliding positions for an MPVISD 704, including: a deployment on top of a roof 702 (FIG. 10A), a half-shade deployment (FIG. 10B), and a full shade deployment (FIG. 10C). Any position along the roof as shown in FIG. 7 can be implemented for at the at least three positions illustrated in FIG. 10A-10C. Although FIG. 7. shows a tilted roof, it should be appreciated that one or more MPVISD(s) 704 can be deployed in flat roofs in accordance with the present disclosure, and also the MPVISD 704 can be installed on top of tilted racks (see illustration of FIG. 6, for example).

Figures 11A, 11B, 11C:
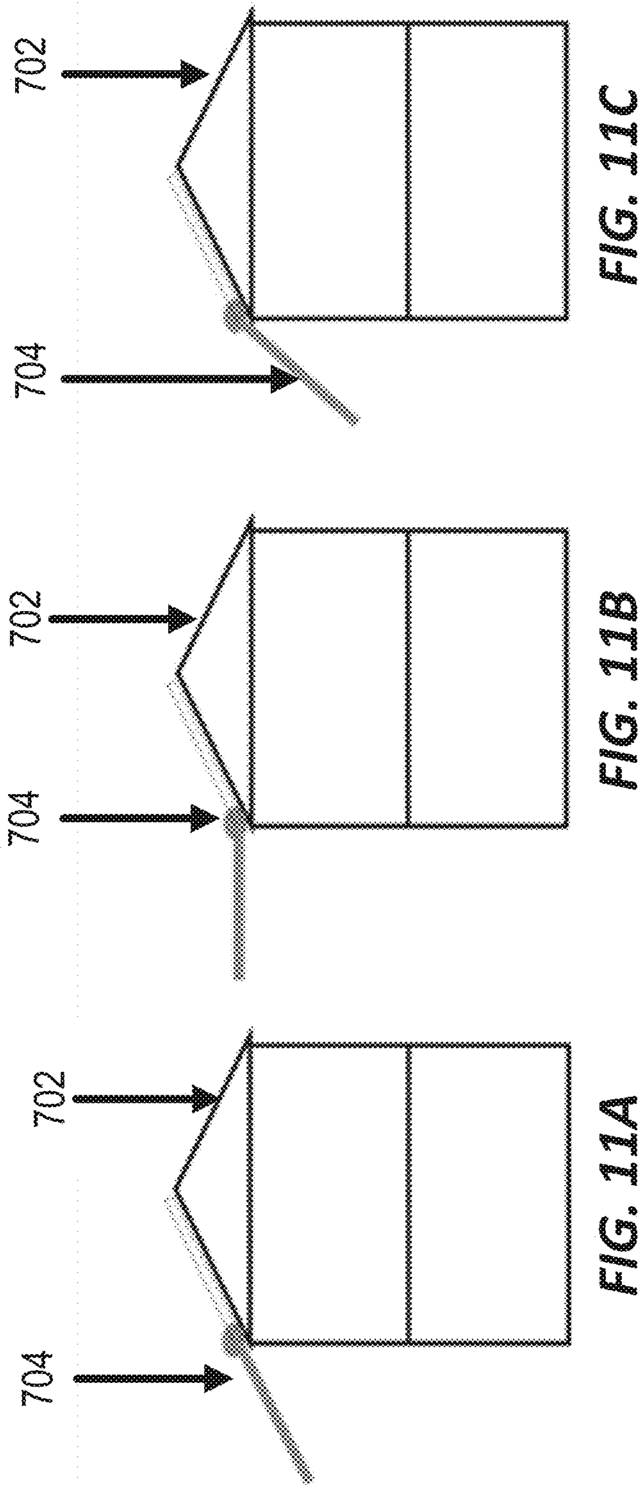
FIGS. 11A-11C shows examples of one-axis rotation positions for an MPVISD in accordance with one or more embodiments of the present disclosure.

FIGS. 11A-11C show examples of one-axis rotation positions for an MPVISD 704 affixed to a roof 702, including a deployment on top of a roof (FIG. 11A), half-shade deployment (FIG. 11B), and a full shade deployment (FIG. 11C). One-axis rotation along the wall's width is shown in FIGS. 11A-11C for three rotation angles. The MPVISD 704 can be made of several modules and thus this rotation can be set for any sliding position (e.g., as described with respect to the embodiments shown in FIGS. 10A-10C) and not only in a full-shade deployment as illustrated in FIG. 11C.

Figures 11D, 11E, 11F:
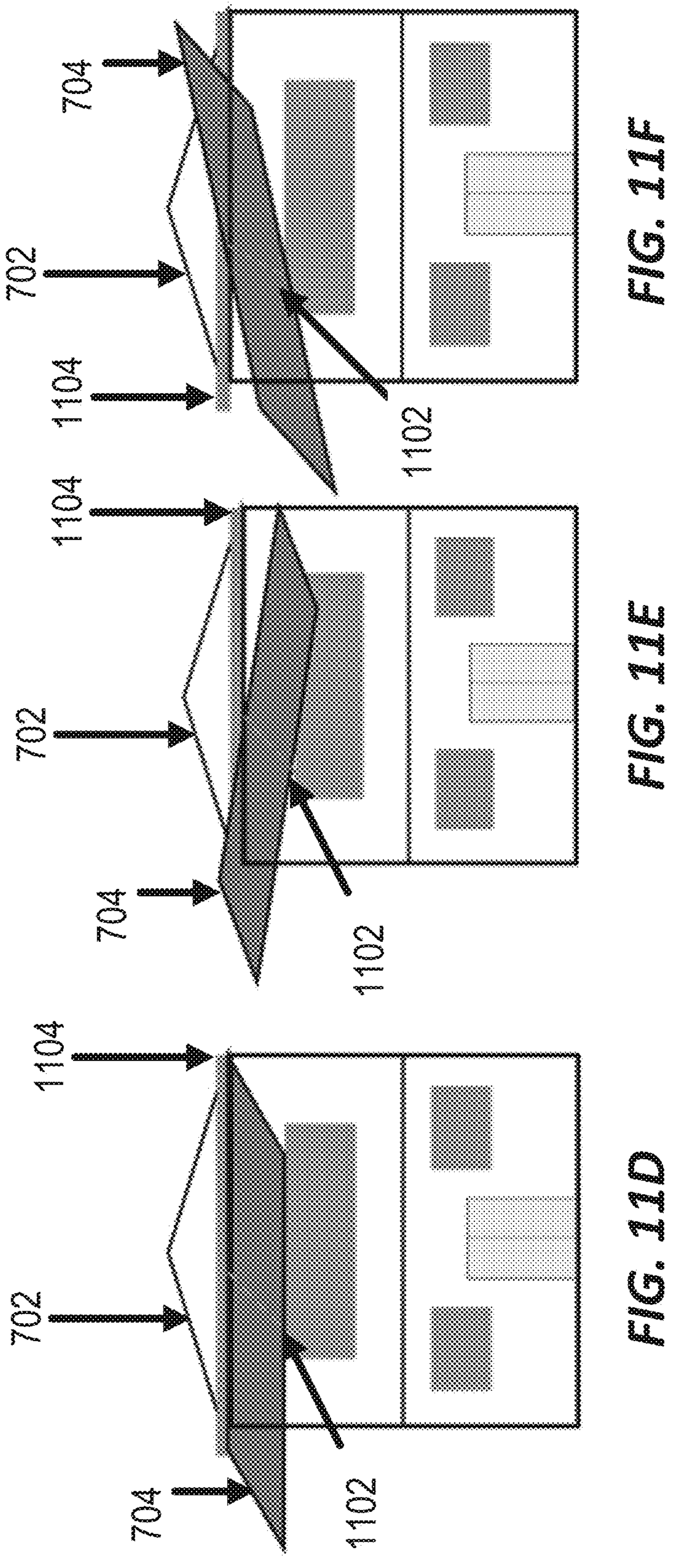

In some embodiments of the present disclosure, the axis of rotation of a MPVISD 704 affixed to a roof is defined by an axis that is not defined by an edge 1104 of the roof 702. A non-limiting example of a MPVISD 704 that tilts along an axis 1102 of rotation different than the edge of the roof 1104 is illustrated in the FIGS. 11D-11F.

Additionally, while the present disclosure describes the rooftop shade in FIGS. 7-11 as an MPVISD, or movable PV integrated shading device, the present disclosure also contemplates that the rooftop shade in FIGS. 7-11 can be a shade without a PV panel. These embodiments of the present disclosure can also be dynamically controlled to affect the shade produced by the shade, and to increase or decrease the energy absorbed by the rooftop of the building, or the insulation provided by the rooftop of the building.

Switchable Insulation Systems

Figure 12A:
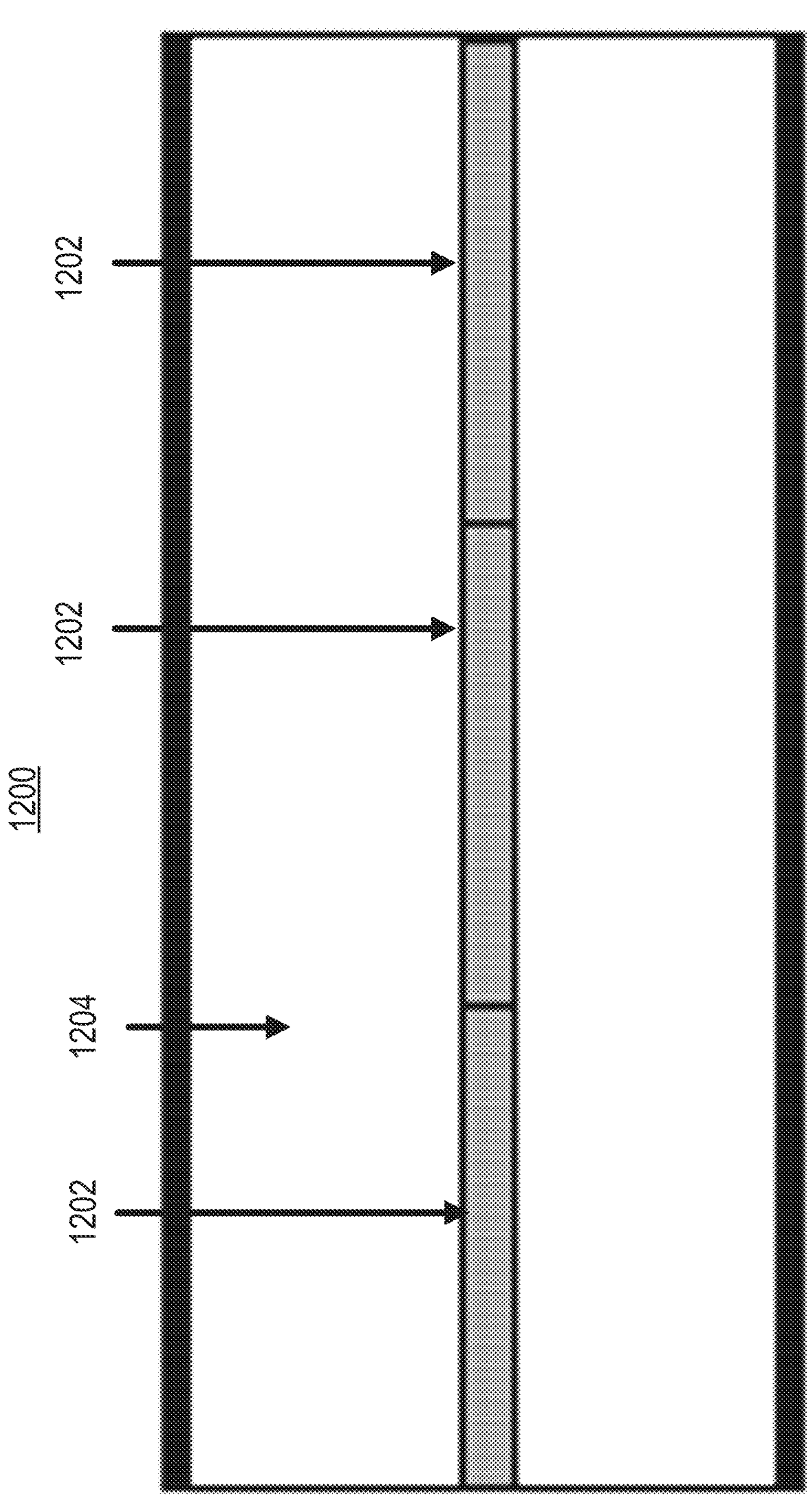
FIGS. 12A-12B shows operation of an attic and/or wall integrated switchable insulation systems (SIS) in accordance with one or more embodiments of the present disclosure.
Figure 12B:
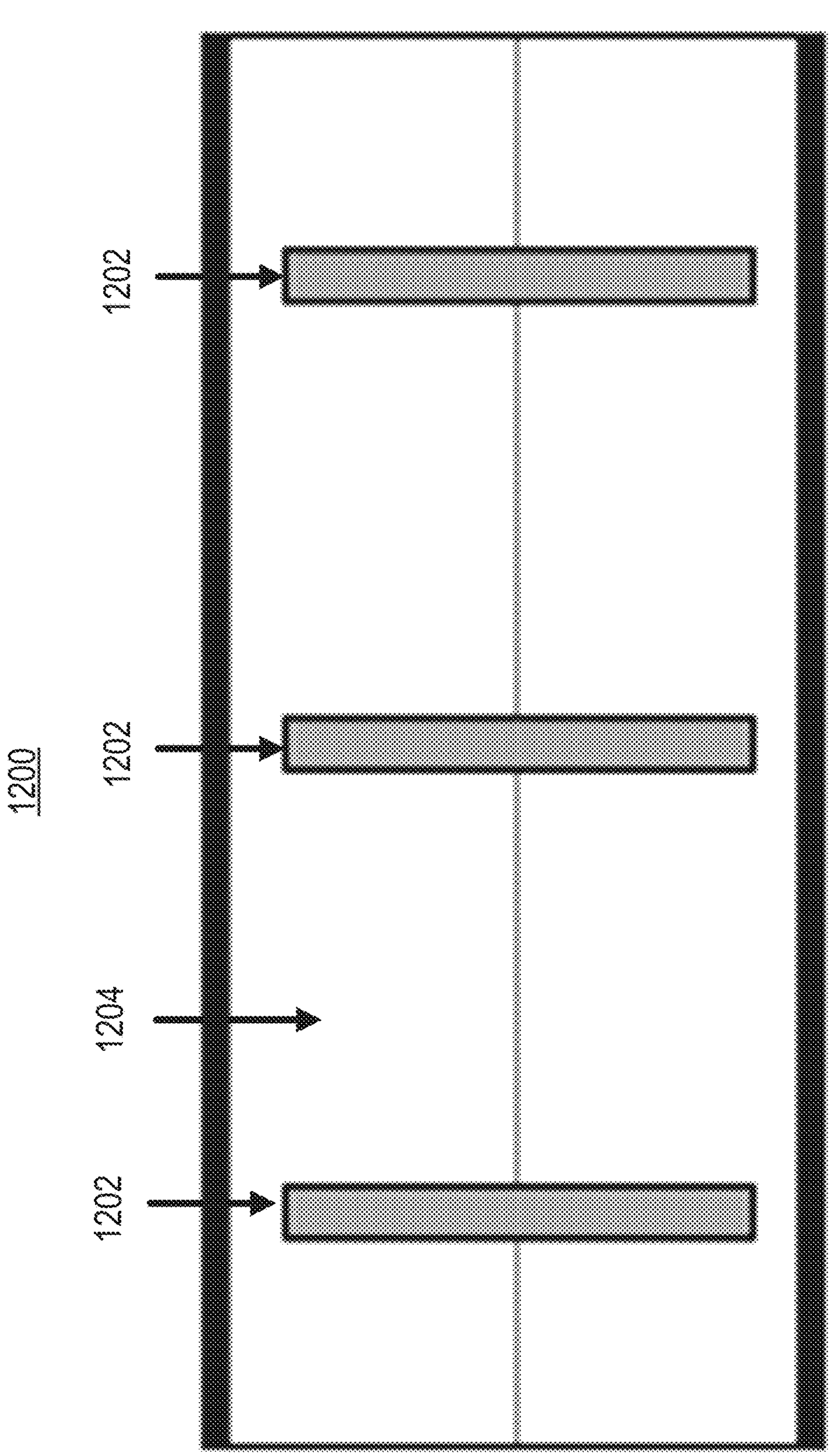

FIGS. 12A-12B illustrate a switchable insulation system 1200 (SISs) including movable insulation panels 1202. The switchable insulation system 1200 can be used in some embodiments of the present disclosure. A portion of wall 1204 is shown, and inside the wall 1204 are the movable insulation panels 1202. The insulation panels 1202 can be moved, for example by rotation, to change the effectiveness of the insulation. In FIG. 12A, the insulation panels 1202 are "closed" providing maximum insulation. Whereas in FIG. 12B, the insulation panels 1202 are "open" providing a minimum amount of insulation. It should be understood that embodiments of the present disclosure can adjust the insulation panels 1202 to any desired position, in order to obtain insulation values between the maximum and minimum values. It should also be understood that the switchable insulation panels 1202 can be installed in parts of the building other than the walls 1204, for example in the attic (e.g. the system 706 shown in FIG. 7).

SISs 1200 can enhance the energy efficiency of residential buildings. SIS 1200 used in accordance with example implementations of the present disclosure can use a rotating mechanism that controls the position of insulation panels 1202 to make full contact or to create separation, as exemplified in FIGS. 12A-12B. This allows the SIS 1200 to switch between high thermal resistance value during the fully closed configuration (FIG. 12A) and low thermal resistance value during the fully open configuration (FIG. 12B). For the configuration of FIG. 10B, the rotating insulation layers can create openings allowing the air to flow through the wall and attic cavities to decrease their R-value (see also examples of attic SIS 706 in FIG. 7 (and wall SIS 708 in FIG. 7). The assembly constructions for both the walls and attic can dictate the specific low thermal resistance values. The high R-value settings for both walls and attic dependent on US climate zone based on ASHRAE 90.2 standard according to the location of the house. In one example implementation, SISs are applied to the attic and exterior walls a house model, and are modulated independently with an objective being to reduce heating and cooling thermal loads. For example, the low R-value can be set to 0.5 $m^2 \cdot K/W$ (RSI-0.5) and 0.6 $m^2 \cdot K/W$ (RSI-0.6) for attic-integrated and wall-integrated SISs respectively. Moreover, the analysis in this study considers that the SIS for each wall (a total of 8 walls; 4 in each floor) and for the attic is controlled independently.

Figure 13:
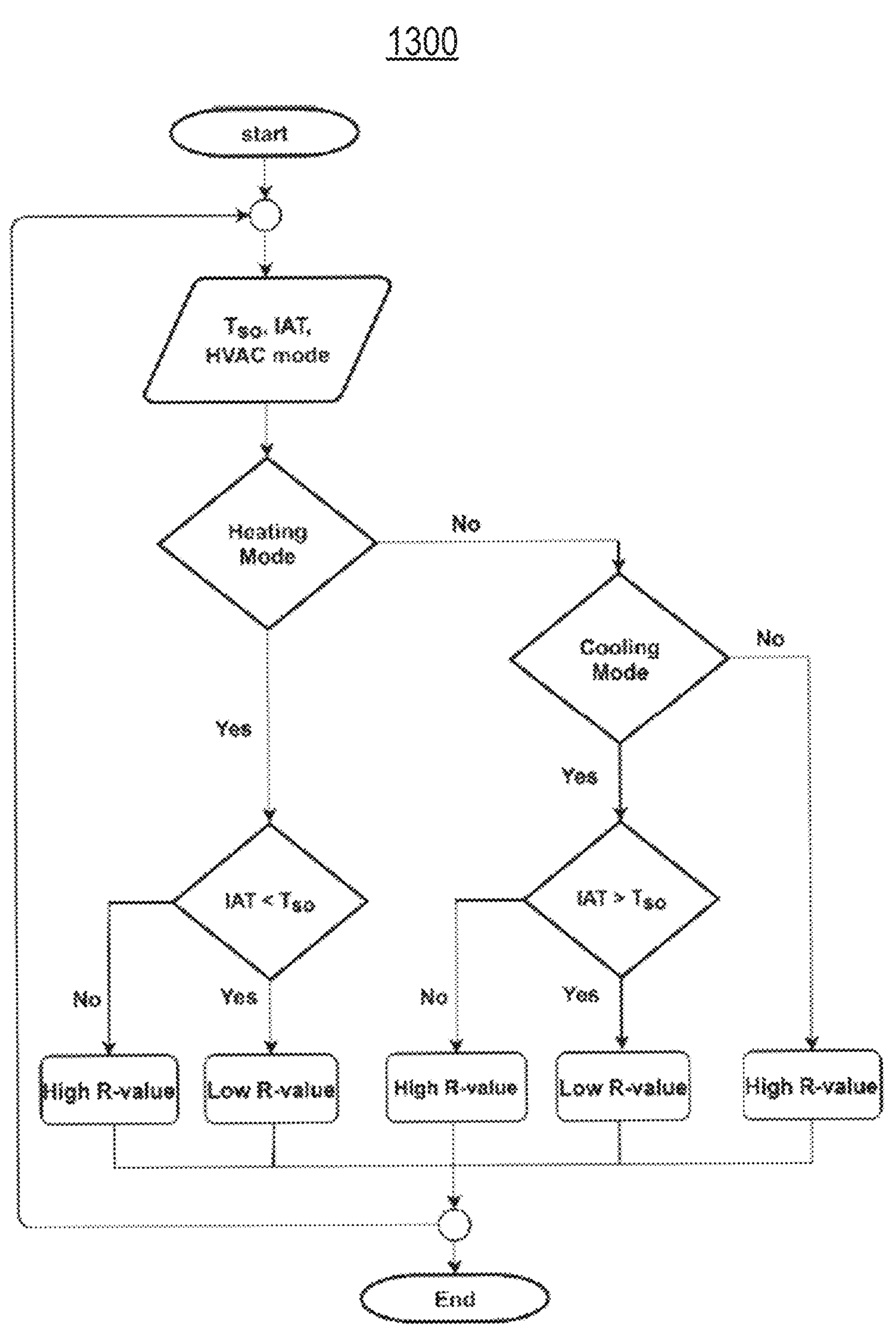
FIG. 13 is a flow diagram showing operations for controlling attic-integrated and wall-integrated SIS, in accordance with one or more embodiments of the present disclosure.

The time and the level of the thermal resistance switchover can be determined using rule sets based on the indoor and outdoor conditions. From the results of a comparative analysis of a wide range of control strategies, temperature-based control strategies can be employed in the embodiments of the present disclosure for their simplicity and effectiveness to control both the attic-integrated and wall-integrated switchable insulation system, as depicted in FIG. 13. As shown in FIG. 13, in one example implementation of the present disclosure, during the heating mode, a controller switches the thermal resistance of the overall attic/wall assembly from the default high R-value setting to low R-value if the mean indoor air temperature (IAT) is less than the attic/wall outside surface temperature ($T_{so}$). The controller switches the R-value of the attic/wall assemblies to their low settings of RSI-0.5/RSI-0.6 offering free heating since the heat flows into the house. During the cooling season, the thermal resistances of the attic/wall assemblies are set to their low value when the mean indoor air temperature (IAT) is higher than the attic/wall outside surface temperature ($T_{so}$). Lowering the thermal resistance allows the trapped heat to be rejected to the ambient environment and thus benefiting from free cooling. Thus, the SIS operated by temperature-based control approach(es) presented herein can maximize heat losses while minimizing heat gains during the cooling season, and the opposite can result during the heating season.

Embodiments of the present disclosure include method 1400 for controlling dynamic shades, switchable insulations systems, and combinations thereof. The method can be implemented by a controller (e.g. the controller 1500 shown in FIG. 15), and the controller can be operably connected to any number of motorized actuators 104 (or other devices) configured to operate dynamic shades 100 (such as the dynamic shades shown in FIGS. 1-11) and/or the switchable insulation system 1200 shown in FIGS. 12A-12B. In some embodiments of the present disclosure, the controller 1500 is part of the motor 104, the shade 100, or the MPVISD 704. For example, in some embodiments of the present disclosure, the system can include more than one controller, or a controller for each of the shades 100, or the MPVISD 704.

According to one embodiment, the method includes receiving 1402 building model information and climate information. The building model information can include information about the thermal characteristics of the building (e.g. the insulation), the positions of windows and doors on the building, and the configuration of the switchable insulation system 1200. The building model information can also include the shape of the building, the and the orientation/location of the building in the world. The building model information can also include information about the characteristics and positions of one or more MPVISDs and/or switchable insulation systems located on or near the building. The climate information can include information about external temperature, climate, season, directional orientation, or time of day. The information can also include the position of the sun in the sky at the building's location on different days, and information about the actual or predicted temperature on one or more days of the year.

At step 1404, the system can determine 1404 a schedule based on the building model information and climate information. The schedule can represent a desired position for each of the shades 100 and/or MPVISDs 704 and/or switchable insulation systems 1200 at particular times. For example, the schedule can specify the positions of shades 100, MPVISDs 704 and switchable insulation systems 1200 at hourly, daily, or monthly intervals (or any other time interval). Determining 1404 the desired position of the shades 100, MPVISDs 704 and switchable insulation systems 1200 can include modeling the expected power output of any PV panels, expected shade provided by the shades 100 or MPVISDs 704, and expected insulation provided by the shades 100, MPVISDs 704, switchable insulations systems 1200, and optimizing a function based on any of these factors, combinations of these factors (and/or other factors). As a non-limiting example, the schedule can be a schedule that is determined 1404 based on minimizing the cost of energy to heat and cool the building, or a schedule that maximizes the electrical energy that can be produced, while still shading the windows.

Based on the schedule 1404 the system can control 1406 the panels to move the shades 100, MPVISDs 704, and switchable insulations systems 1200 to the positions specified the schedule. To control 1406 the shades 100, MPVISDs 704, switchable insulations systems 1200, the controller can dynamically move the shades 100, MPVISDs 704, switchable insulations systems 1200 according to the schedule as time elapses. This can include receiving information corresponding to the positions of the shades 100, MPVISDs 704, switchable insulations systems 1200 from sensors corresponding to the shades 100, MPVISDs 704, switchable insulations systems 1200. Based on the positions information, the system can iteratively adjust the positions of the the shades 100, MPVISDs 704, switchable insulations systems 1200

The present disclosure contemplates that the other systems disclosed herein can be used in combination with the method 1400. For example, the method 1400 can also include receiving 1402 information corresponding to the state of a static or dynamic reflective cool roof and/or information related to the status of PV integrated smart glazed panels, determining 1404 a schedule based on the that information, and controlling 1406 the system based on that schedule.

Figure 15:
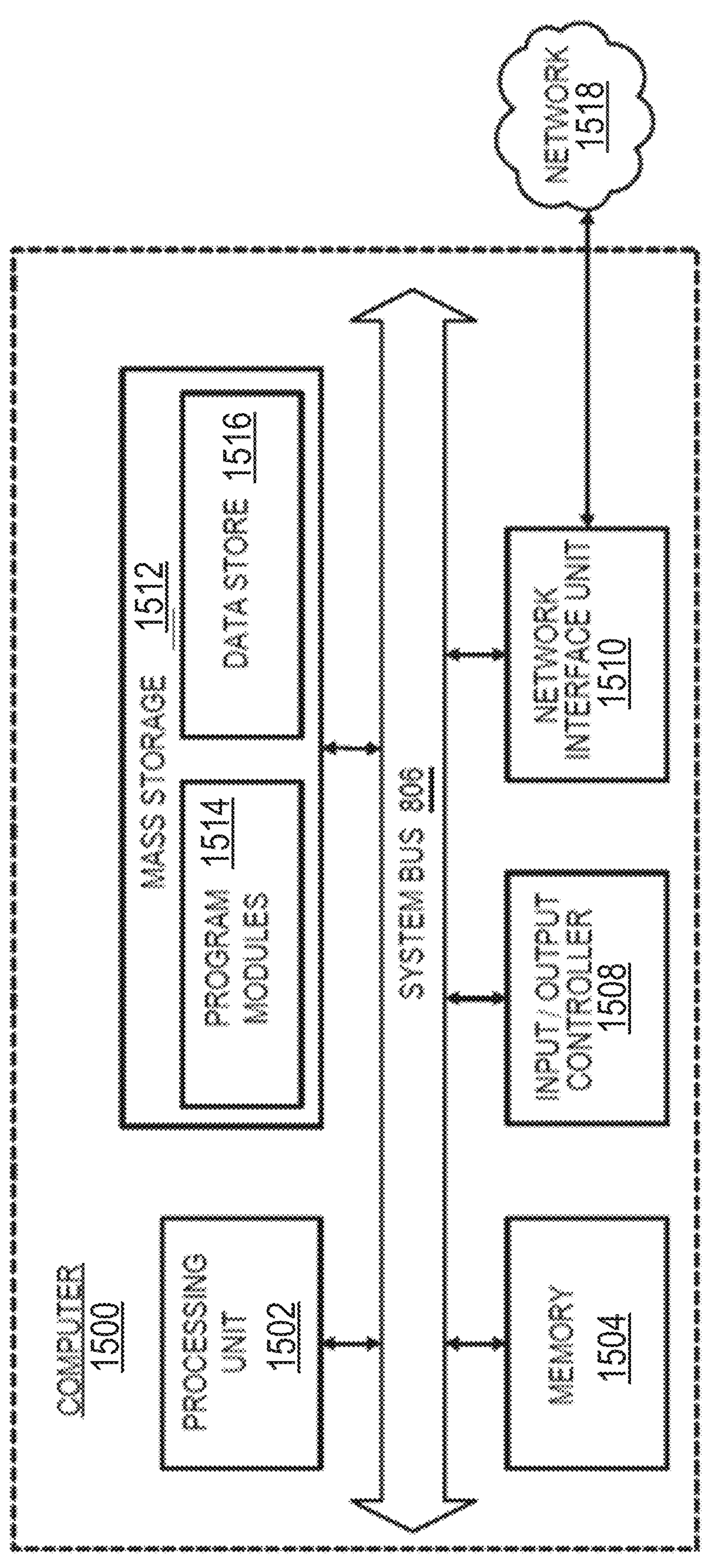
FIG. 15 is diagram illustrating a computer hardware architecture for a computing system capable of implementing one or more embodiments.

It should be understood that the controller shown in FIG. 15 can also implement the method of FIG. 13, alone or in combination with the method shown in FIG. 14.

ADDITIONAL EXAMPLE IMPLEMENTATIONS

Additional example embodiments of the present disclosure will now be described in further detail.

Example 1

According to some embodiments of the present disclosure, a system including sliding overhangs (for example the sliding overhangs shown in FIG. 4C) can be operated with or without PV arrays. The system can be controlled settings at regular intervals (e.g. hourly, daily and monthly settings) to optimize any specific objective function.

In this example, the embodiment of the present disclosure was configured to minimize the annual net energy demand from a structure (in this example, a ranch house) assuming that any excess electricity generated from the PV arrays can be supplied to the grid without the need for batteries. In this example, three control strategies are contemplated for controlling the rotating overhangs whether they have PV arrays or not:

1. No-PV Controls: The dynamic overhangs are deployed without any PV arrays and their angle is adjusted automatically to reduce annual energy consumption depending on the allowed position ranges and movement options (i.e., sliding only or sliding and rotating)
2. With PV and Load-Tracking Controls: The dynamic overhangs are equipped with PV arrays and are adjusted to reduce the building's annual energy consumption depending on the movement options and angle positions.
3. With PV and PV-Tracking Controls: The PV integrated dynamic overhangs can be equipped with a solar tracking system to maximize the PV electricity generated but with the goal to minimize the annual net energy demand of the building using the allowed motion options and angle position ranges. In some embodiments, this control yield results distinct from the results of a PV tracking system that is configured with the sole objective is to maximize generated electricity from the PV arrays regardless of energy demand of the building.

It should be understood that other time intervals, angles, and panel positions are contemplated by the present disclosure.

Example 2

According to some embodiments of the present disclosure, a system including tiltable PV overhangs (for example the overhangs shown in FIGS. 1-2) can be operated with or without PV arrays using predefined schedules such as daily and monthly schedules or a set of controls to minimize a desired objective function. In some embodiments of the present disclosure, the dynamic overhang can be controlled to minimize the annual net energy consumption. As a non-limiting example, the ranges of operating conditions can be separated into four ranges:

1. Dynamic: 0°-180°: this option can include the full position range for the dynamic overhang with angles varying between 0° (low-position) which can result in a highly shaded window as well as obstructed view for building occupants to 180° (high position) resulting in a fully unshaded window and can be thermally equivalent to a no-overhang option. Moreover, this option can allow the dynamic overhang to track the sun position over the year to maximize the electricity generation by the PV array.
2. Dynamic: 45°-135°: this option can represent an intermediate operation range for the dynamic overhang to potentially allows occupants to view the outdoors through the window as well as to avoid hitting any architectural features of the housing unit (i.e., upper parts of the wall and roof) with angle varying between 45° (low-position) and 135° (high-position). For the PV array, this position still offers some tracking flexibility for the sun position.
3. Dynamic: 90°-135°: this option has a restrained operation range for the dynamic overhang to permit unobstructed access to the outdoor views with angles that can be set between 90° (low-position) and 135° (high-position). A bifacial PV system can also be used in some embodiments of the present disclosure.
4. Dynamic: 45°-90°: this option has also a restrained operation range for the dynamic overhang but offers better solar access to the PV array in most US locations with angles varying between 45° (low-position) and 90° (high-position).

Existing whole-building energy simulation tools can be utilized to model moveable shading using the distinct building energy modeling (DBEM) approach especially for monthly position adjustments used in some embodiments of the present disclosure. Specifically, according to some embodiments of the present disclosure, the DBEM approach can determine the annual energy performance of the dynamic overhangs through modeling a series of static overhangs set at various angle positions on monthly or daily basis. In this study, only discrete values of angles are considered including 0°, 45°, 90°, 135°, 180° for all the dynamic overhangs and control strategies. Another alternative to model dynamic overhangs is to use the parametric behavior maps (PBMs) approach. The PBM utilizes solar transmittance schedules for specific operation configurations as applied for hourly control options of the dynamic overhang considered in this study. The hourly controls of dynamic overhangs can provide higher energy savings compared to daily and monthly settings depending on the climate and the window orientation. It should be understood that these the time intervals of the schedules disclosed in this example, as well as the ranges of motion, are intended only as non-limiting examples of time intervals and ranges. It should be understood that other time intervals, angles, and panel positions are contemplated by the present disclosure.

Example 3

According to some embodiments of the present disclosure, hourly building energy modeling can be used in conjunction with tiltable panels, for example the tiltable panels described with reference to FIGS. 1-2 and Example 2, above. Again, it should be understood that the dynamic overhang technology in embodiments of the present disclosure allows for any continuous angle setting. However, it should also be understood that discrete angles can be used in embodiments of the present disclosure in order to simplify modeling.

In some embodiments of the present disclosure, dynamic overhangs can be used for both reducing both heating and cooling energy end-uses when compared to static overhang systems. The present disclosure contemplates that different modeling approaches can be used depending on the time scale. According to some embodiments, a DBEM technique can be used, and the energy performance of the dynamic overhangs can be modeled as static overhangs placed in different discrete positions.

According to some embodiments, for hourly-scale modeling, solar transmission schedules can be developed for different operating scenarios of the dynamic overhangs specific to representative days during one-year analysis. Building energy simulation tools can model the shadowing effects of direct solar radiation from exterior shading devices to estimate specifically fractions of the shaded window area are determined for a limited set of days in order to reduce the computation efforts (as a non-limiting example 12 to 14 days). The hourly simulations can model hourly operation for the dynamic overhangs during one-year simulation analysis.

As described herein, a "controller" or "programmable controller" may be a programmable computing device configured to execute instructions such that the functions are performed in a system. For example, a "controller" may utilize one or more aspects and/or components of a computing system as described as follows. For example, a "controller" may utilize one or more aspects and/or components of a computing system as described as follows.

FIG. 15 is a computer architecture diagram showing a general computing system capable of implementing one or more embodiments of the present disclosure described herein. A computer 1500 may be configured to perform one or more functions associated with embodiments illustrated in one or more of the other. It should be appreciated that the computer 1500 may be implemented within a single computing device or a computing system formed with multiple connected computing devices. For example, the computer 1500 may be configured for a server computer, desktop computer, laptop computer, or mobile computing device such as a smartphone or tablet computer, or the computer 1500 may be configured to perform various distributed computing tasks, which may distribute processing and/or storage resources among the multiple devices.

As shown, the computer 1500 includes a processing unit 1502, a system memory 1504, and a system bus 1506 that couples the memory 1504 to the processing unit 1502. The computer 1500 further includes a mass storage device 1512 for storing program modules. The program modules 1514 may include modules executable to perform one or more functions associated with embodiments illustrated in other Figures of the present disclosure. The mass storage device 1512 further includes a data store 1516.

The mass storage device 1512 is connected to the processing unit 1502 through a mass storage controller (not shown) connected to the bus 1506. The mass storage device 1512 and its associated computer storage media provide non-volatile storage for the computer 1500. By way of example, and not limitation, computer-readable storage media (also referred to herein as "computer-readable storage medium" or "computer-storage media" or "computer-storage medium") may include volatile and non-volatile, removable and non-removable media implemented in any method or technology for storage of information such as computer-storage instructions, data structures, program modules, or other data. For example, computer-readable storage media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 1500. Computer-readable storage media as described herein does not include transitory signals.

According to various embodiments, the computer 1500 may operate in a networked environment using connections to other local or remote computers through a network 1518 via a network interface unit 1510 connected to the bus 1506. The network interface unit 1510 may facilitate connection of the computing device inputs and outputs to one or more suitable networks and/or connections such as a local area network (LAN), a wide area network (WAN), the Internet, a cellular network, a radio frequency network, a Bluetooth-enabled network, a Wi-Fi enabled network, a satellite-based network, or other wired and/or wireless networks for communication with external devices and/or systems.

The computer 1500 may also include an input/output controller 1508 for receiving and processing input from a number of input devices. Input devices may include, but are not limited to, keyboards, mice, stylus, touchscreens, microphones, audio capturing devices, or image/video capturing devices. An end user may utilize such input devices to interact with a user interface, for example a graphical user interface on one or more display devices (e.g., computer screens), for managing various functions performed by the computer 1500, and the input/output controller 1508 may be configured to manage output to one or more display devices for visually representing data. The bus 1506 may enable the processing unit 1502 to read code and/or data to/from the mass storage device 1512 or other computer-storage media. The computer-storage media may represent apparatus in the form of storage elements that are implemented using any suitable technology, including but not limited to semiconductors, magnetic materials, optics, or the like. The program modules 1514 may include software instructions that, when loaded into the processing unit 1502 and executed, cause the computer 1500 to provide functions associated with other embodiments illustrated and described herein. The program modules 1514 may also provide various tools or techniques by which the computer 1500 may participate within the overall systems or operating environments using the components, flows, and data structures discussed throughout this description. In general, the program module 1514 may, when loaded into the processing unit 1502 and executed, transform the processing unit 1502 and the overall computer 1500 from a general-purpose computing system into a special-purpose computing system.

The processing unit 1502 may be constructed from any number of transistors or other discrete circuit elements, which may individually or collectively assume any number of states. More specifically, the processing unit 1502 may operate as a finite-state machine, in response to executable instructions contained within the program modules 1514. These computer-executable instructions may transform the processing unit 1502 by specifying how the processing unit 1502 transitions between states, thereby transforming the transistors or other discrete hardware elements constituting the processing unit 1502. Encoding the program modules 1514 may also transform the physical structure of the computer-readable storage media. The specific transformation of physical structure may depend on various factors, in different implementations of this description. Examples of such factors may include, but are not limited to: the technology used to implement the computer-readable storage media, whether the computer-readable storage media are characterized as primary or secondary storage, and the like. For example, if the computer-readable storage media are implemented as semiconductor-based memory, the program modules 1514 may transform the physical state of the semiconductor memory, when the software is encoded therein. For example, the program modules 1514 may transform the state of transistors, capacitors, or other discrete circuit elements constituting the semiconductor memory.

As another example, the computer-storage media may be implemented using magnetic or optical technology. In such implementations, the program modules 1514 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. Other transformations of physical media are possible without departing from the scope of the present disclosure.

Numerous characteristics and advantages provided by aspects of the present disclosure have been set forth in the foregoing description, together with details of structure and function. The patentable scope of certain embodiments is set forth in the appended claims. While the present disclosure is disclosed in several forms, it will be apparent to those skilled in the art that many modifications can be made therein without departing from the spirit and scope of the present disclosure and its equivalents. Therefore, other modifications or embodiments as may be suggested by the teachings herein are particularly reserved.

What is claimed is:

1. A system, comprising:

at least one rail connected to an exterior surface of a building such that the at least one rail is parallel to ground below the rail;

one or more movable shading devices that slide across the external surface of the building along the at least one rail to cover a window of the building or to expose the window of the building, wherein at least one of the one or more movable shading devices includes at least one PV-integrated smart glazed panel;

a programmable controller operably coupled to at least one of the one or more movable shading devices;

wherein the programmable controller is configured to slide the at least one of the one or more movable shading devices with respect to the external surface of a building or house, wherein the external surface of the building or house includes at least one wall surface and at least one roof surface, and wherein the programmable controller is configured to move at least one of the movable shading devices based on a building energy model, wherein the building energy model comprises information and the overall optical properties of the at least one roof surface as modified by respective positions of the movable shading devices relative to the roof.

2. The system of claim 1, wherein at least one of the one or more movable shading devices includes at least one photovoltaic (PV) array panel.

3. The system of claim 1, wherein the one or more movable shading devices comprise a PV-integrated smart glazed panel on both sides of the shading devices.

4. The system of claim 1, wherein at least one of the one or more movable shading devices is configured as a rotatable, PV-integrated overhang extending over at least one wall surface of the building or house.

5. The system of claim 1, wherein the one or more movable shading devices are slidable in position with respect to a roof of the building or house.

6. The system of claim 1, wherein the one or more moveable shading devices are slidable along a slope of a roof, to cover at least some of the roof.

7. The system of claim 1, wherein the one or more movable shading devices are configured as overhangs positioned on an edge of a roof of the building or house and are configured to provide shade over at least a portion of walls and/or windows of the building or house.

8. The system of claim 1, wherein the one or more movable shading devices are configured to rotate, with respect to an edge portion of a roof and with respect to the walls, about an angular axis defined by the edge portion of the roof, such that the one or more shading devices are positionable in a plurality of various angular positions with respect to the roof and with respect to the at least one wall surface.

9. The system of claim 1, wherein the one or more shading devices are configured to be adjustable in position and/or angle to rotate about an axis of rotation defined such that the one or more shading devices are tilted at a non-zero angle with respect to a lateral roofline of a roof of the building or house, and such that the one or more shading devices tilt in a first direction at a non-zero angle or tilt in a second, opposite direction than the first direction and at a non-zero angle.

10. The system of claim 1, further wherein the programmable controller configured to selectively cause the movement of the one or more movable shading devices.

11. The system of claim 1, wherein the programmable controller is further configured to move one or more of the movable shading devices according to solar tracking.

12. The system of claim 1, wherein the climate information comprises external temperature.

13. The system of claim 1, wherein the climate information comprises season information.

14. The system of claim 1, wherein the climate information comprises a time of day.

15. The system of claim 1, wherein the climate information comprises solar tracking information.

16. The system of claim 1, wherein the building energy model comprises thermal characteristics of the building.

17. The system of claim 1, wherein the building energy model further comprises a distinct building energy model, wherein the distinct building energy model comprises estimates of an energy performance of the at least one of the one or more movable shading devices at a plurality of predetermined time intervals.

18. The system of claim 1, wherein the at least one PV-integrated smart glazed panel comprise clear and tinted states.

19. A system, comprising:

at least one rail connected to an exterior surface of a building such that the at least one rail is parallel to ground below the rail;

one or more movable shading devices that slide across the external surface of the building along the at least one rail to cover a window of the building or to expose the window of the building, wherein the one or more movable shading devices include at least one PV-integrated smart glazed panel;

a programmable controller operably coupled to at least one of the one or more movable shading devices;

wherein the programmable controller is configured to slide the at least one of the one or more movable shading devices with respect to the external surface of a building or house, wherein the programmable controller is further configured to position one of the one or more movable shading devices on the at least one rail at an angle that is greater than 90 degrees as measured from portions of the exterior surface below the one of the movable shading devices;

wherein the external surface of the building or house includes at least one wall surface and at least one roof surface, and wherein the programmable controller is configured to move the at least one of the movable shading devices based on a building energy model.

20. A system, comprising:

at least one rail connected to an exterior surface of a building such that the at least one rail is parallel to ground below the rail;

one or more movable shading devices that slide across the external surface of the building along the at least one rail to cover a window of the building or to expose the window of the building, wherein the one or more movable shading devices include at least one PV-integrated smart glazed panel;

a programmable controller operably coupled to at least one of the one or more movable shading devices;

wherein the programmable controller is configured to slide the at least one of the one or more movable shading devices with respect to the external surface of a building or house, one of the one or more movable shading devices on the at least one rail at an angle that is greater than 90 degrees as measured from portions of the exterior surface below the one of the one or more movable shading devices;

wherein the programmable controller is configured to move the at least one of the one or more movable shading devices based on a building energy model; and wherein the angle between the shading device and the exterior surface can be controlled independently of the distance that the one of the movable shading devices slides along the rail.

* * * * *